INVENTOR.
William M. Black
BY
Townsend, Loftus & Abbett
ATTORNEYS.

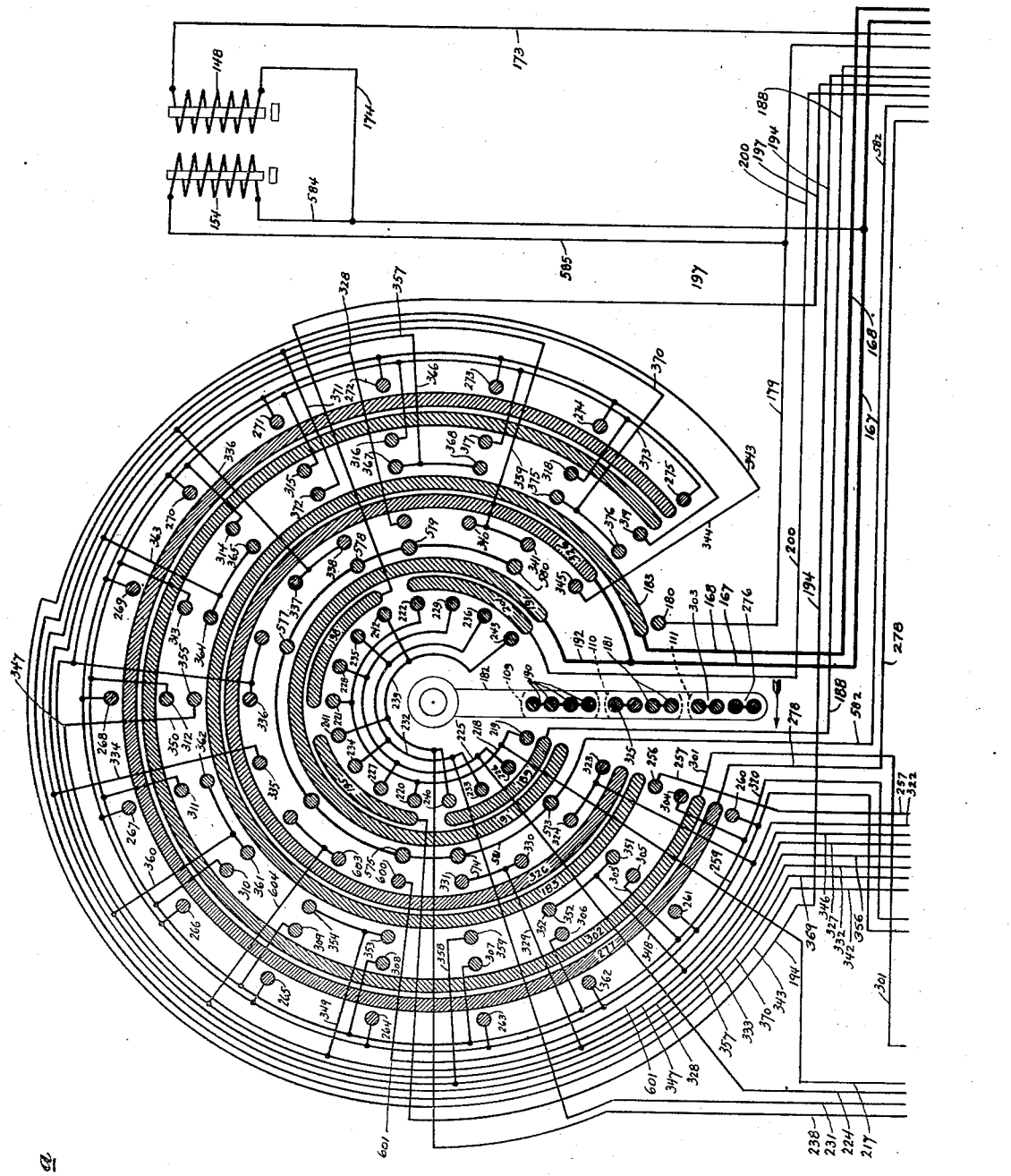

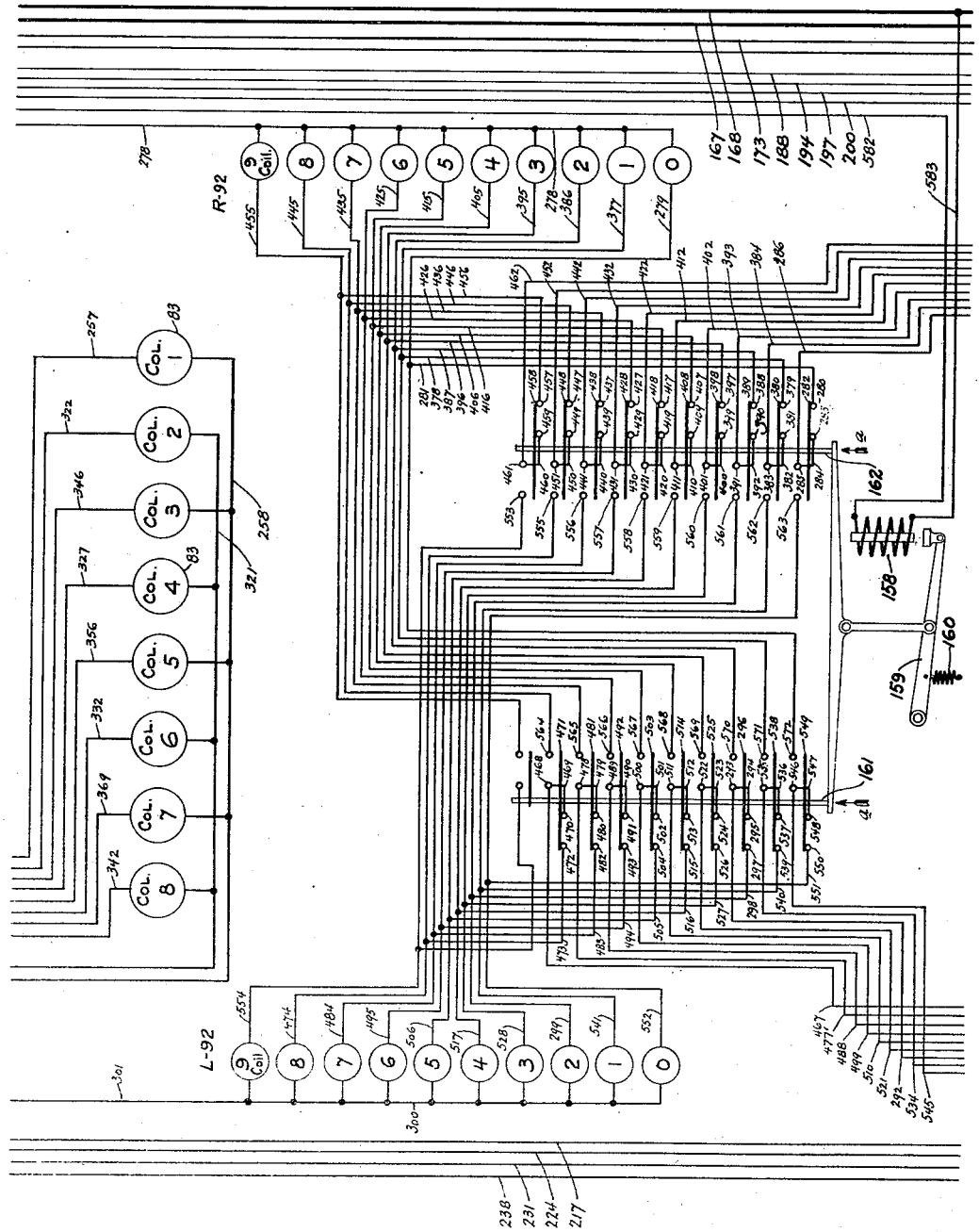

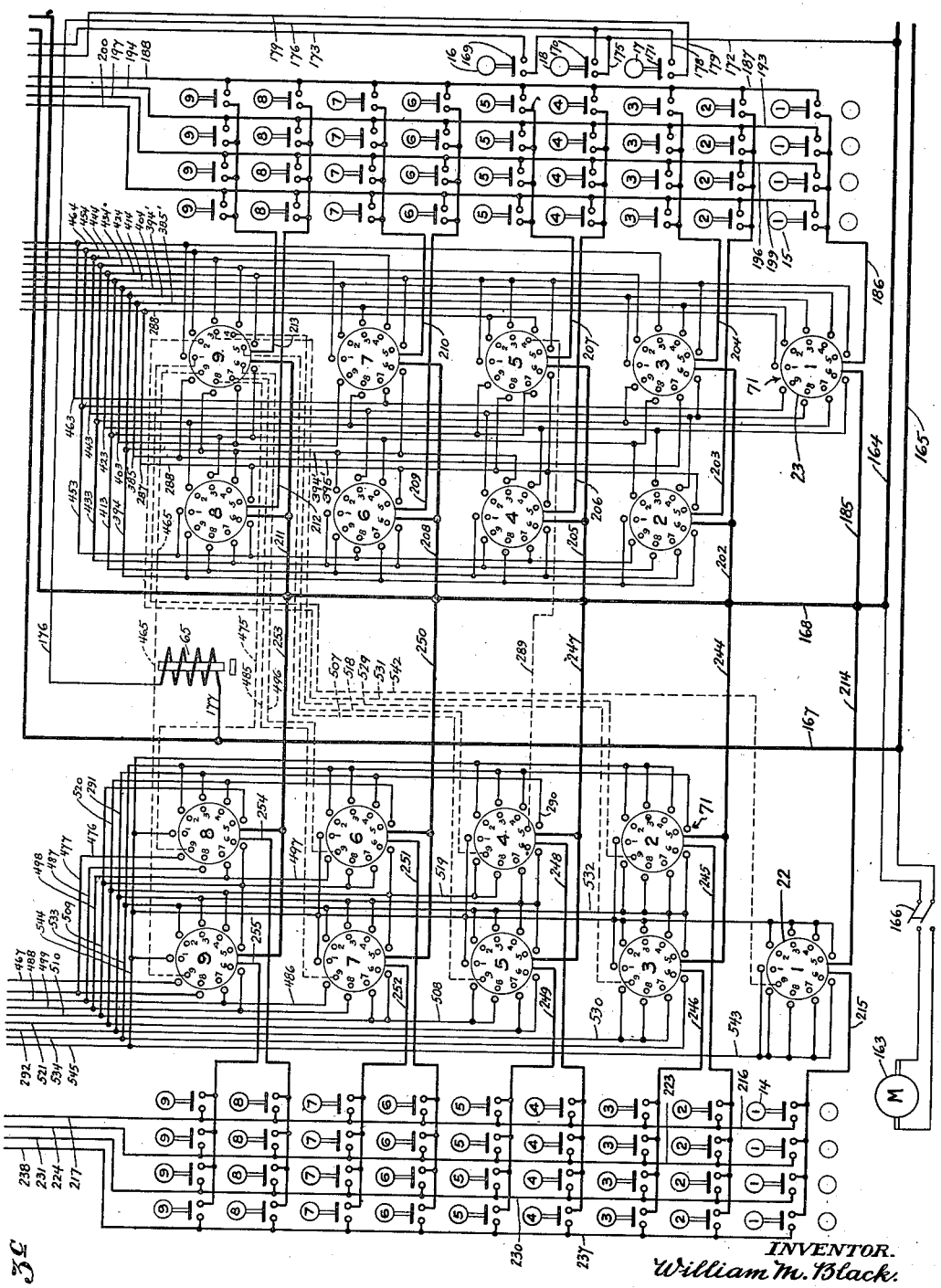

Aug. 9, 1932.  W. M. BLACK  1,870,705
CALCULATING MACHINE
Filed Jan. 19, 1927   15 Sheets-Sheet 6

INVENTOR.
William M. Black.
BY Townsend, Loftus & Abbett
ATTORNEYS.

Aug. 9, 1932.   W. M. BLACK   1,870,705
CALCULATING MACHINE
Filed Jan. 19, 1927    15 Sheets-Sheet 8

INVENTOR.
William M. Black.
BY
Townsend, Loftus + Abbott
ATTORNEYS.

Aug. 9, 1932.  W. M. BLACK  1,870,705
CALCULATING MACHINE
Filed Jan. 19, 1927  15 Sheets-Sheet 9

INVENTOR.
William M. Black.
BY
Townsend, Loftin & Abbett
ATTORNEYS.

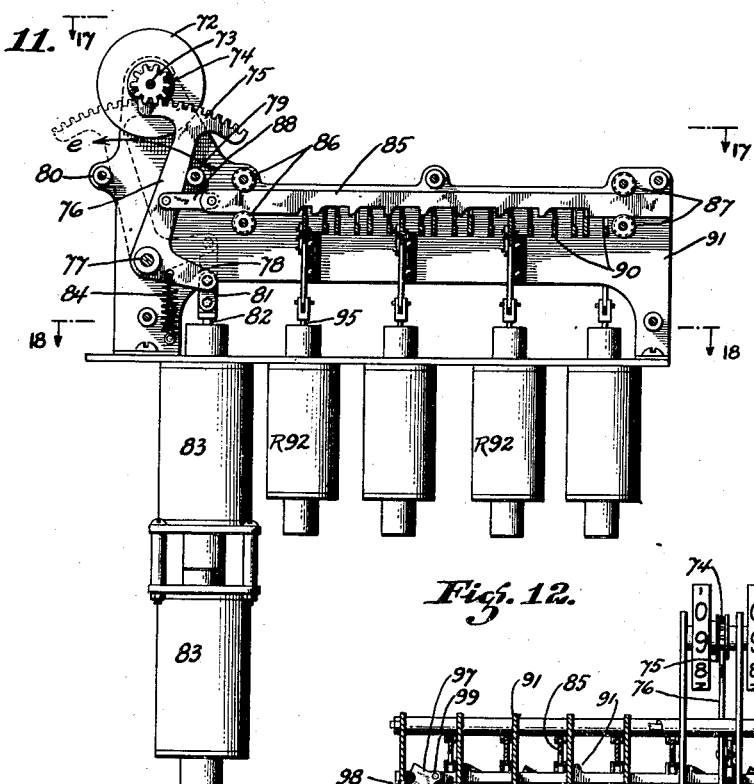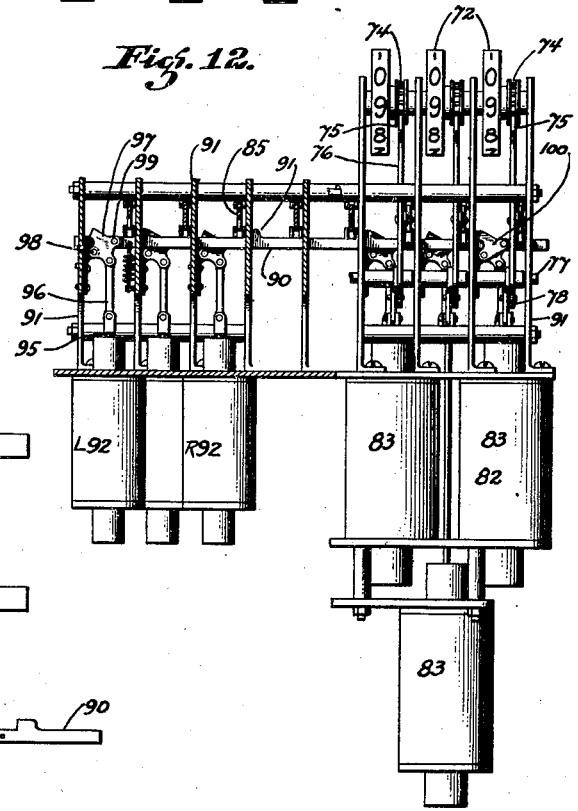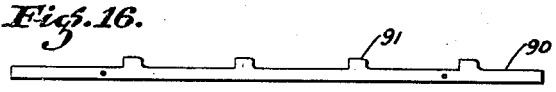

Aug. 9, 1932.  W. M. BLACK  1,870,705
CALCULATING MACHINE
Filed Jan. 19, 1927   15 Sheets-Sheet 11

INVENTOR.
William M. Black.
BY
Townsend, Loftus & Abbett
ATTORNEYS.

Aug. 9, 1932.  W. M. BLACK  1,870,705
CALCULATING MACHINE
Filed Jan. 19, 1927  15 Sheets-Sheet 12

INVENTOR.
William M. Black.
BY
Townsend Loftus & Abbett
ATTORNEYS.

Aug. 9, 1932.   W. M. BLACK   1,870,705
CALCULATING MACHINE
Filed Jan. 19, 1927   15 Sheets-Sheet 13

INVENTOR.
William M. Black.
BY Townsend, Loftus & Abbott
ATTORNEYS.

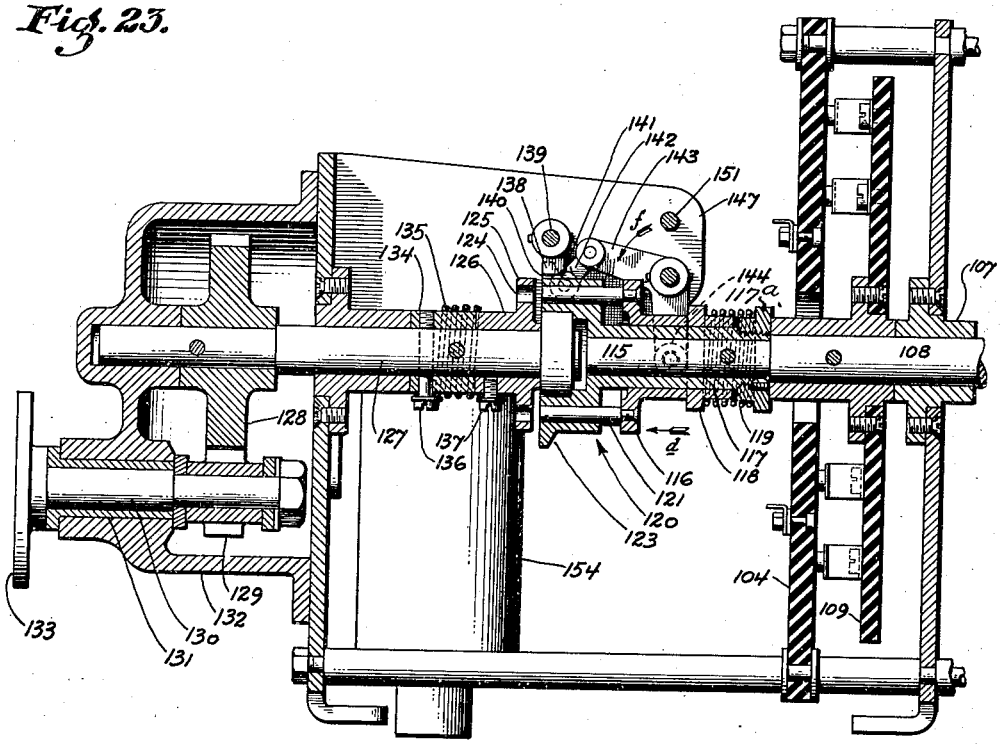
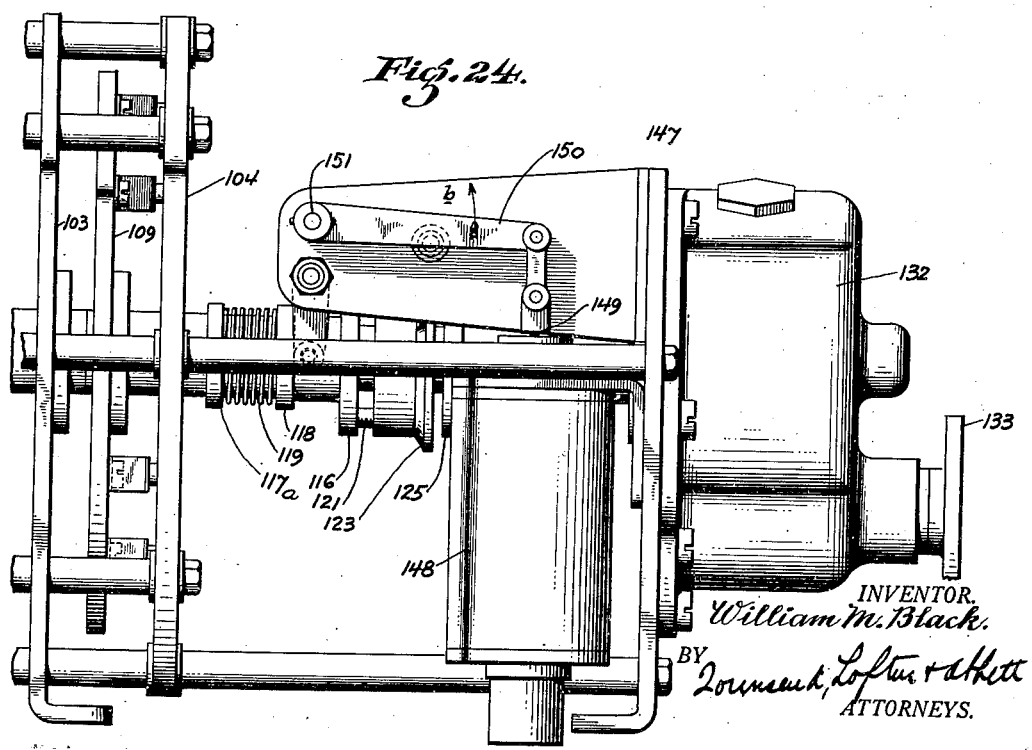

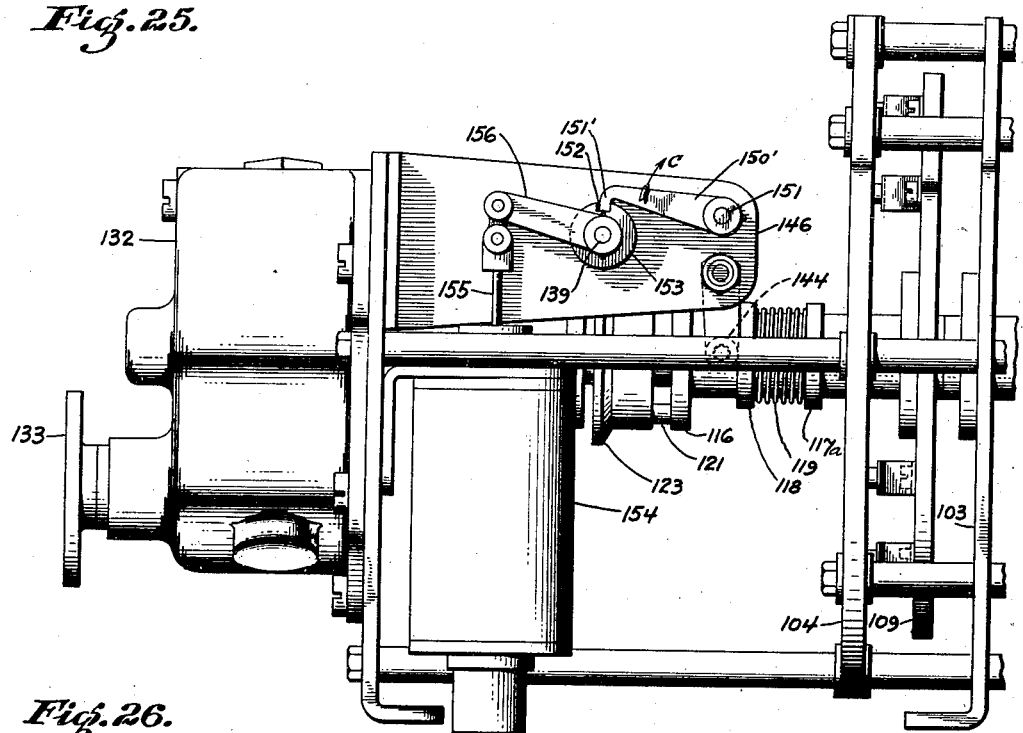

Patented Aug. 9, 1932

1,870,705

UNITED STATES PATENT OFFICE

WILLIAM M. BLACK, OF FRESNO, CALIFORNIA

CALCULATING MACHINE

Application filed January 19, 1927. Serial No. 162,052.

This invention relates to calculating machines and is particularly concerned with machines of this character by which problems in multiplication, as well as addition, may be rapidly solved.

At the present time various types of calculating machines have been developed which perform different mathematical operations, including the multiplication of figures. The multiplication operations in these instances have been accomplished by what may be termed repetitive addition, requiring that a multiplicand shall be repeated the number of times of the number in the multiplier. This method requires a prolonged manipulation with great possibility of error.

It is the principal object of the present invention, therefore, to provide a calculating machine which will operate automatically and which requires only manual operation of the key banks comprising a relatively small number of control keys to set the machine in motion and to cause it to automatically proceed, by electrically operated mechanism, to solve the problem set up on the key banks, by a direct operation of the register dials, it being especially desirable in the present invention to solve problems of multiplication and to rapidly obtain the product of the multiplication of two numbers set up on the key banks, the number of places in the multiplicand and the multiplier being limited by the width of the key banks only.

The present invention contemplates the provision of banks of multiplicand and multiplier keys actuating a set of product registering dials, the fundamental principle of operation of the machine being here embodied by way of example in a structure in which two digit keys actuate two relays, each relay partially closing nine separate circuits, one partially closed circuit of each group being interconnected to complete a circuit which operates to register a predetermined product. Further mechanical and electrical elements are embodied in the structure to duplicate the primary and secondary circuits and to provide that the machine shall be compact in structure and accurate in operation. Specifically, the invention contemplates the use of a bank of numbered keys arranged in duplicate columns and known as "the multiplicand bank of keys", another bank of numbered keys arranged in duplicate columns and known as "the multiplier bank of keys", and a set of dials sufficient in number to register the entire product, or sum, obtained by multiplication or addition of figures of the largest number of columns in both of said key banks, the keys in each of the two banks being interconnected electrically with relay switches which close a secondary circuit including dial operating mechanism for a predetermined product dial, and in a manner to insure that each dial will register one numeral of the answer of the problem being solved.

The invention is illustrated by way of example in the accompanying drawings, in which—

Figures 3a, 3b and 3c are views showing a complete wiring diagram of the apparatus, Figure 3a specifically showing the wiring of the selector switch by way of diagram, Figure 3b showing the wiring diagram of the lock bar solenoids, the product dial solenoids and the reversing switch, and Figure 3c showing the multiplicand and multiplier key bank wiring diagrams.

Figure 11 is an enlarged view in side elevation showing the product dial operating unit as disassociated from the remainder of the apparatus.

Figure 12 is an enlarged view in end elevation showing a portion of the product dial operating mechanism with parts broken away or omitted for the sake of clearness.

Figures 13 and 14 are views in side elevation showing the product stop bars.

Figures 15 and 16 are views in side elevation showing the lock bars used in conjunction with the product stop bars.

Figure 23 is an enlarged view in central vertical section through the selector switch and its driving mechanism, as seen on the line 23—23 of Figure 4.

Figure 24 is an enlarged view in side elevation showing the selector switch and its driving mechanism as disassociated from the machine, and in a position reversed from it as it appears in Figure 23.

Figure 25 is an enlarged view in side elevation showing the opposite side of the selector switch and its driving mechanism from that shown in Figure 24.

Figure 26 is a fragmentary view in plan showing the selector switch and its driving mechanism.

Figure 6:
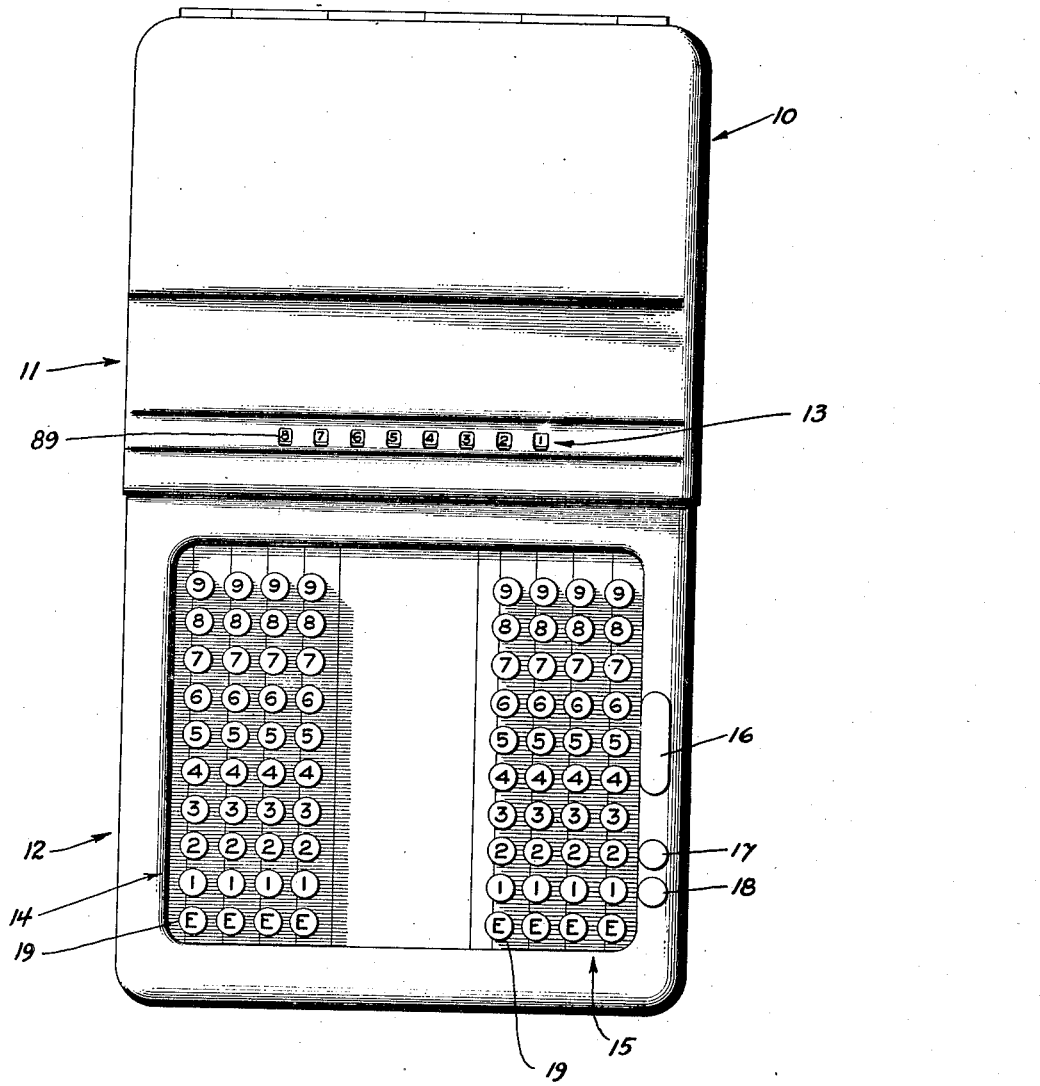
Figure 6 is a view in plan showing the calculating machine and the manner in which the various control keys are arranged with relation to each other.
Figure 7:
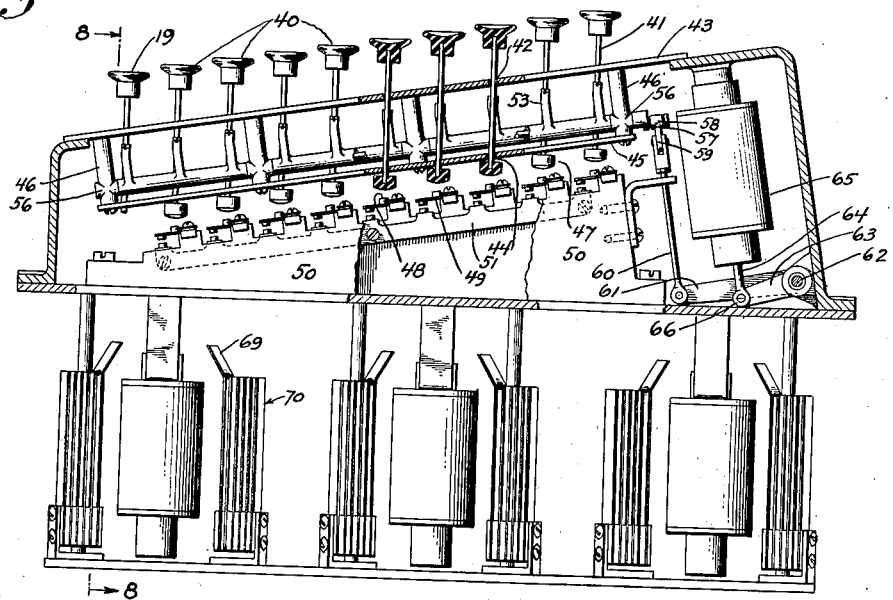
Figure 7 is a view of a portion of the key bank mechanism as shown in vertical section, and on a larger scale than indicated in Figure 4 of the drawings, certain parts being broken away for the purpose of more clearly disclosing the operative relation of the parts to each other.
Figure 8:
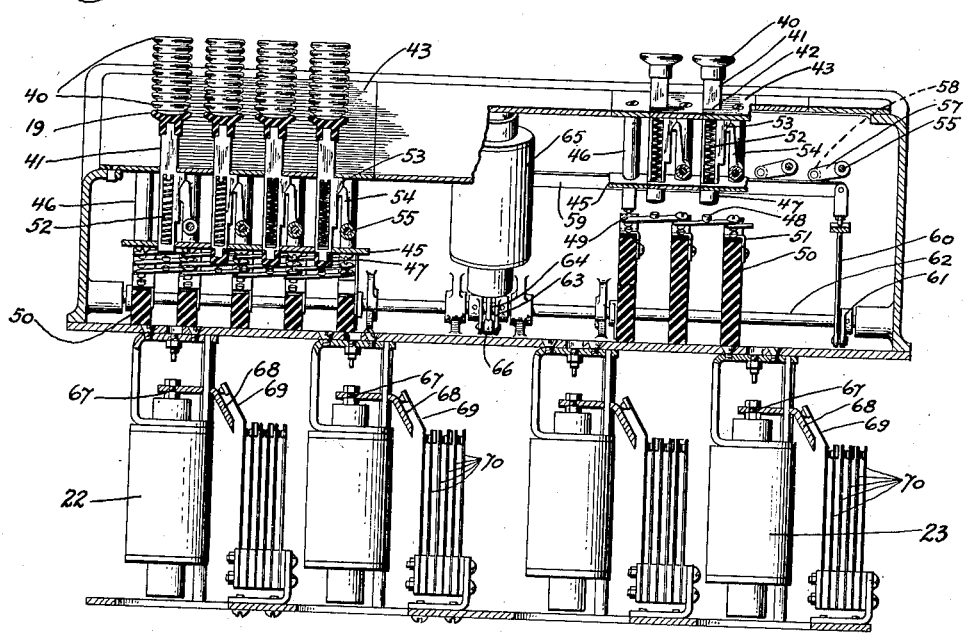
Figure 8 is a view in transverse vertical section through the key banks, as seen on line 8—8 of Figure 7, the view showing parts broken away for the sake of clearness.
Figure 9:
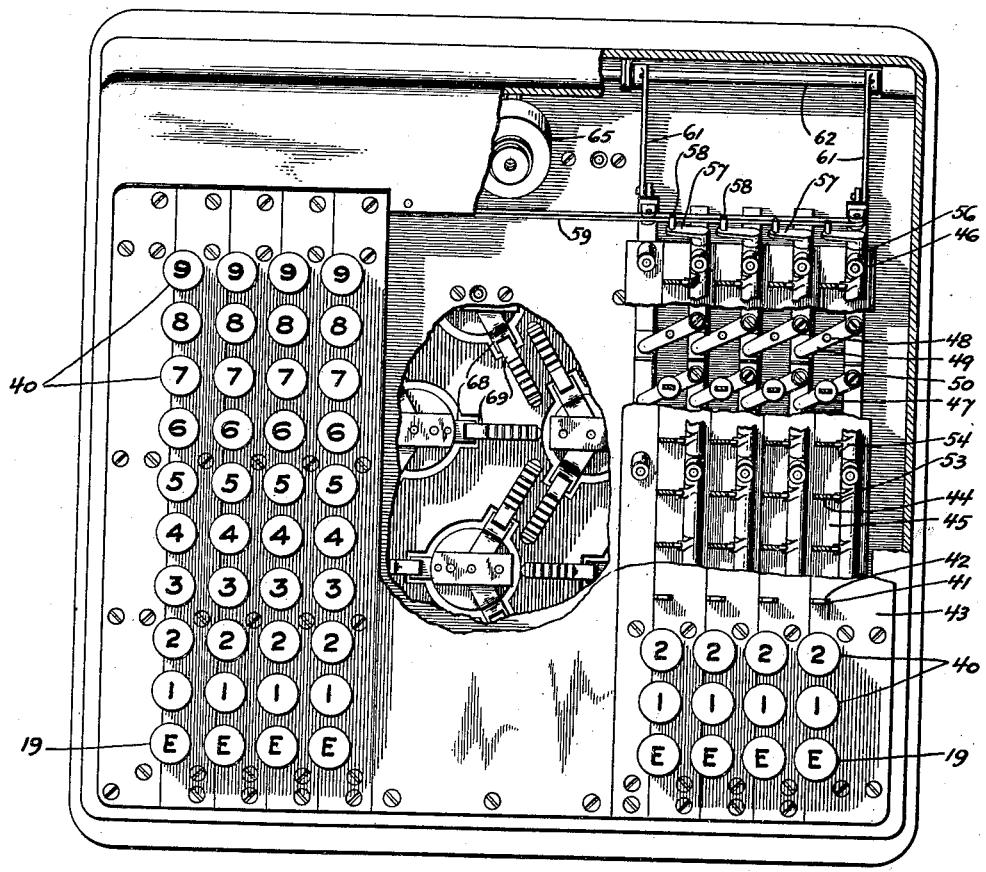
Figure 9 is a view in plan showing the key bank construction with parts broken away to more clearly disclose the manner in which the keys operate and the arrangement of the key bank relays.

Referring more particularly to Figure 6 of the drawings, in which a plan view of the assembled machine is disclosed:

10 indicates the case of the machine having a dial mechanism portion, section 11, at the rear thereof, and a bank section, 12, at the front thereof. It will be understood, as the description progresses, that under some conditions it might be desirable and more convenient for the dial operating section of the case and the bank section of the keys to be remotely disposed with relation to each other and connected by means of a suitable electrical cable. As shown in Figure 6, the dial portion of the case discloses figures on a series of product dials as generally indicated at 13. The key bank portion of the case is shown as comprising a multiplicand bank of keys, 14, and a multiplier bank of keys, 15. By way of example, the two banks of keys are shown as being arranged in four columns each, although it will be understood that a greater number of columns will be required when larger numbers are to be handled by the machine.

Conveniently disposed at one side of the key banks is an operating key, 16, an interlocking key, 17, to cause the selector switch to operate the key release solenoid when the problem has been completed, and a manual key release button, 18. It is also noted that at the bottom of each of the columns of figures an error key, 19, is provided to permit correction when keys have been inadvertently depressed.

Figure 1:
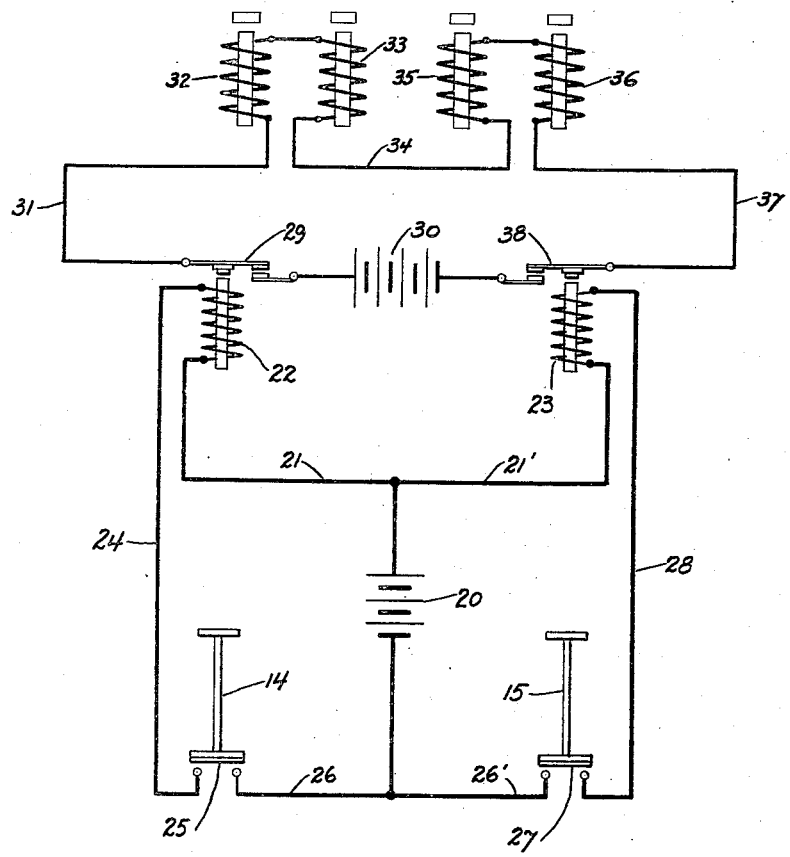
Figure 1 is a simplified diagrammatical view of the fundamental electric circuit with which the present invention is concerned.

The fundamental operating principle of the apparatus may be readily understood by reference to Figure 1, where it will be seen that 14 indicates a key of the multiplicand bank, and 15 indicates a key of the multiplier bank. These keys close a circuit from a source of supply, 20, through wires, 21 and 21', to multiplicand and multiplier key relays, 22 and 23, respectively. The circuit from the relay 22 is continued along a wire 24 to one contact of the multiplicand key, 14, and through the contact plate, 25. This circuit continues along a lateral communicating wire, 26, to the source of supply, 20. The contact 27 of key 15 completes a circuit through a conductor 28 to the multiplier key relay, 23, and thence along wire 21' to the source of supply, the circuit continuing along wire 26' to the key contact. These circuits will be hereinafter termed "the primary circuits" and it will be seen that in their simplest form they each include a key of one of the banks, a key relay and a source of supply, all in series.

The multiplicand key relay, 22, operates a switch member, 29, to close the circuit from a source of electric energy, 30, through a wire 31, and thence in series to a product dial solenoid, 32, and a lock bar solenoid, 33, the current continuing along a wire, 34, to a lock bar solenoid, 35, in series with a product dial solenoid, 36, after which the circuit continues along conductor, 37, to the relay switch, 38, where the circuit is completed, to the source of supply, 30. It will be understood, of course, that the sources of supply, 20 and 30, may be combined if found convenient.

It will be seen that the circuit just described is a secondary circuit, and that it includes the means for operating the product dials. By analysis of the wiring diagram, shown in Figure 1, it will be noted that the secondary circuit is broken in at least two places, and that it is necessary for two key relay circuits to be energized in order to complete the secondary circuit.

Key bank mechanism

Referring particularly to Figures 4 to 10, inclusive, of the drawings, it will be seen that the multiplicand key bank and the multiplier key bank are made in duplicate and all of their mechanical construction is identical. For that reason, it will be only necessary to describe the details of construction of one bank, it being understood that this description is equally applicable to both banks of the mechanism.

The keys are here shown as arranged in longitudinally extending columns, the keys bearing numerals progressing in increments of 1 to 9 inclusive. The machine is here disclosed as equipped with four columns in each key bank. The keys, 40, are individually mounted on vertically moving fingers, 41. These members slidably extend through openings, 42, in a face plate, 43, and similar openings, 44, in a guide plate, 45. The guide plate extends parallel to the face plate and is supported in spaced relation therebeneath by bracket members 46. The lower ends of the shanks 41 extend through the guide plate 45 and are there fitted with buttons, 47, which are formed of dielectric material. These buttons are adapted to be depressed and to encounter pressure points, 48, on spring contact members, 49. The contact members 49 are supported on bases, 50, of dielectric material. The bases are spaced from each other a suitable distance and carry bus bars, 51. The spring contact members, 49, span the distance between the bus bars and establish individual connections between contact points on these bus bars when brought in contact therewith.

The circuits, including these contact members, 49, will be described hereinafter. The keys 40 are depressed against the action of expansion springs, 52, one of which is embodied in the structure of each key and so mounted as to insure that the keys will be restored to their non-depressed position unless locked.

In operation of the present invention, it is essential that the keys which are depressed shall be temporarily locked in their depressed positions until after the problem which has been set up on the keys has been solved. This is accomplished by providing each of the keys with a lock lug, 53, projecting from the side of its shank. A lock detent, 54, is normally disposed below the lug and has an inclined face which bears against a corresponding face on the lower edge of the lug so that the detent will swing outwardly until the lug has passed below the shoulder thereon, after which the detent will move into engagement with the lug and prevent the key from returning to its normal inoperative position. The detents, 54, are arranged in rows extending the length of each column of keys. The detents in each column are mounted upon a detent shaft, 55. These shafts extend through bearings, 56, carried by the brackets 46, and at their ends are fitted with cranks, 57, carrying pins, 58. These pins rest upon the upper surface of a key release bar, 59, and so disposed with relation to the bar that upward movement of the key release bar, 59, will cause all of the detent shafts in both banks of keys to swing outwardly, thus simultaneously swinging the detents to inoperative positions and releasing all of the keys. The key release bar is connected with lifting rods, 60, secured at the opposite ends thereof. The lower ends of these rods are connected with arm, 61, carried upon a key release shaft, 62, which extends parallel to the bar 59 and therebeneath. An operating lever, 63, is secured to the shaft at a point intermediate its ends and is connected with the plunger 64 of a key release solenoid, 65, by a connecting rod, 66. The circuit, including the solenoid, will be hereinafter described.

Key relays

Figure 10:
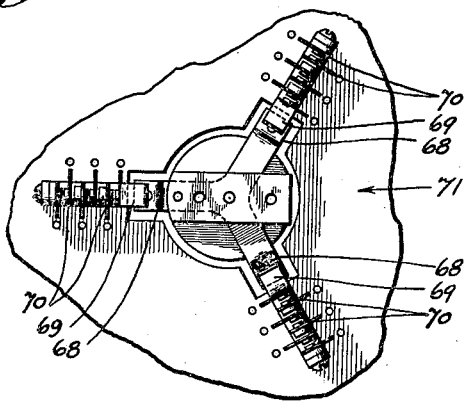
Figure 10 is an enlarged view in plan showing one of the key bank relays.

By reference to Figure 1 of the drawings, it will have been seen that the keys of the multiplicand and multiplier banks operate separate relays, each relay, as indicated in Figure 1 of the drawings, controlling a single contact switch. The switch has been shown in this manner in that figure of the drawings for the sake of simplicity in explaining the fundamental circuit of the machine. This switch, however, in practice, is a multiple switch simultaneously and partially completing nine individual circuits. These circuits are established to cause certain dials of the dial mechanism to be actuated to give the answer of the problem representing the multiplication of numbers in the multiplicand bank and the multiplier bank. It has been found that comparatively few combinations of figures are present in all multiplication problems, and in the present instance these empirical combinations are automatically made through the initial operation of the key relays and the multiple switches controlled thereby. The key relays are individually operated by completing the circuit through the contact members 49 (Figs. 7-8), as the individual keys are depressed. The key relay solenoids of the multiplicand bank are indicated at 22 in Figure 8 of the drawings and the key relay solenoids of the multiplier bank are indicated at 23 in the same view. These solenoids carry plungers 67, which lift a wedge bar 68 when the solenoids are energized. Different bars extend radially from the plunger and are shown in Figure 10 as three in number. Each of the bars encounters a spring contact member 69 which is deflected outwardly and closes contacts between a plurality of spring contact fingers, 70. These fingers are individually connected with wires and when the pairs of spring fingers 70 are in contact will partially establish a plurality of secondary circuits.

By reference to Figure 3c of the drawings, the various multiple switches are diagrammatically indicated at 71. It is to be understood that there is one of these switches for each digit in any column of each key bank, and that when a particular key is depressed it will actuate a particular key relay solenoid, 22 or 23, and this in turn will close all of the contacts in the individual switch 71. There are nine circuits to be closed by these contacts, and in Figure 3c of the drawings they have been indicated by the numerals 1 to 9, inclusive, arranged around the circumference of a dial, while a large numeral has been placed in the center of the circle to indicate the particular key which affected the switch. By examining the dotted lines on the diagram, it will be noted that the switches 71 are cross connected so that a number 9 key relay switch in the multiplier bank will be connected through lateral lead wires, as indicated by dotted line in Figure 3c, to the number 9 contact on each of the key relay switches 71 in the multiplicand bank, and that these wires will be connected on the switch 71 of the number 9 multiplier key to the contacts bearing the number or value of the switch to which they are connected in the multiplicand bank, e. g.: the number 9 multiplier key relay switch 71, as shown in Figure 3c, is indicated with contact point No. 1 connected with contact point No. 9 on the No. 1 multiplicand key relay switch, the contact No. 2 of the multiplier key relay switch with contact No. 9 of the multiplicand key relay switch, No. 2, the contact No. 3 of the multiplier key relay switch No. 9 with the contact No. 9 of the No. 3 multiplicand key relay switch, and so on. By this arrangement, as will be hereinafter pointed out, all of the available combinations of figures may thus be obtained to produce multiplication.

Product dial mechanism

The setting of the multiplicand keys and the multiplier keys to solve a problem places selected circuits in a partial condition of completion. These circuits are afterwards completed through product dial mechanism and a selector switch, to be hereinafter described. Referring to Figures 4, 11 to 18, inclusive, it will be seen that the product dial mechanism comprises a plurality of independently operating dials, 72, mounted upon a horizontally extending shaft, 73. These dials bear numerals from 1 to 9 and zero, disposed at spaced intervals. The dials are intended to be rotated to indicate a numeral in a column of the product, this rotation being independently effected by the multiplier and multiplicand apparatus previously described. Each of the dials has associated therewith a pinion, 74, in mesh with a segmental gear, 75. The gear segment, 75, is carried on an arm, 76, and may operate on a shaft, 77. A lever arm, 78, is formed as a part of the structure, by which the gear may be swung from its normal position against a stop, 79, to its extreme operating position against a stop, 80. The operating arms, 78, extend rearwardly and are engaged by connecting shackles, 81. The connecting shackles of the individual arms are fastened to solenoid plungers, 82, which extend into the well of their respective product dial solenoids, 83. The construction and arrangement of the product dial operating mechanism is particularly disclosed in Figures 4, 5, and 11 to 18, inclusive of the drawings. In these figures it will be seen that in order to arrange the dials in closely spaced relation to each other, the product dial solenoids are disposed in two rows, one above the other, with alternate solenoids in each row. The solenoids are to move the plunger 82 upwardly against the action of a tension spring, 84.

Figure 17:
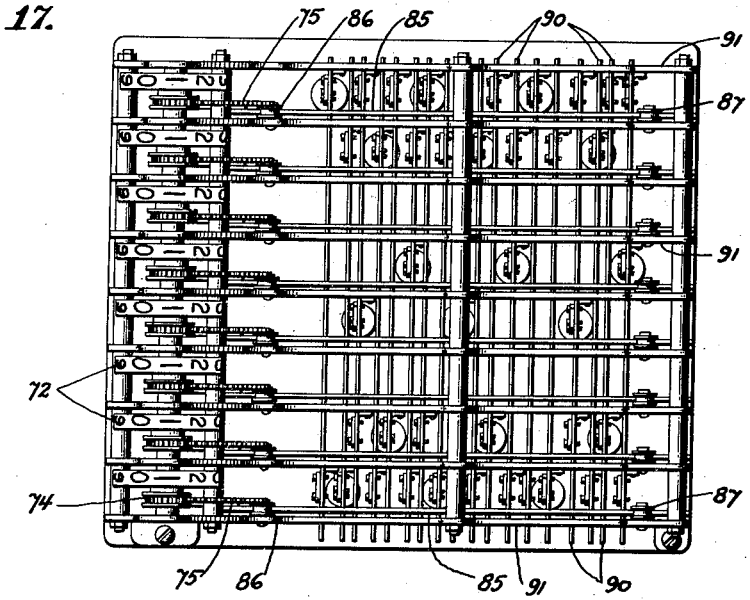
Figure 17 is a view in plan through the product dial mechanism as viewed in the direction indicated at 17—17 in Figure 11.

By reference to Figures 11 and 17 of the drawings, it will be seen that without other provisions the energizing of the solenoids, 83, will cause a dial to rotate to its extreme position. For this reason, escapement mechanism is provided to selectively limit the degree of rotation of a dial which is actuated, and to thereby insure that it will "set up" a certain number in the product obtained from the calculation. This escapement mechanism provides a series of product stop bars, 85, one of which is connected with each of the gear segments, 75. These bars move substantially horizontally and slide between guide rollers 86 and 87. A link, 88, articulately connects the forward end of each bar with its respective gear segment, 75. The under face of each of the bars is serrated, that is to say, it is formed with a plurality of notches and shoulders, eight in number. These shoulders are spaced progressively increasing distances apart, the variation between any two shoulders being sufficient to permit an additional degree of rotation of a dial in order to cause the next succeeding number on the dial to be "set up" in the product and to be disclosed through the product dial windows, 89.

In order to regulate this escapement, transversely sliding lock bars, 90, are disposed beneath the product dial stop bars, 85. These lock bars extend through openings in vertical frame members, 91, and may be operated by the lock bar solenoids R 92 and L 92. The locks bars, 90, are formed with teeth, 91, along their upper edges, as shown in Figures 15 and 16, and when the lock bars are shifted horizontally these teeth stand in the path of the teeth on the product dial stop bars 85 and determine the amount of movement which may be made by the stop bars in actuating the dials. By reference to Figures 13 to 16, inclusive, it will be noted that the product dial stop bars are of slightly different form, as shown in Figures 13 and 14, and that the lock bars are slightly different, as shown in Figures 15 and 16. These variations in design have been made in order to make the machine more compact and to permit the stop bars to be easily controlled, while a pair of dials work simultaneously.

Figure 13 shows a product dial stop bar for an even numbered dial column, and Figure 14 shows a product dial stop bar for an odd numbered dial column, while Figure 15 shows the lock bar for operating in conjunction with the even column stop bar, and Figure 16 shows a lock bar to operate in conjunction with the odd column stop bar.

The lock bars are shifted to their obstructing positions by the lock bar solenoids, 92, operating a plunger, 95, and pushing upwardly on a connecting rod, 96. This swings a crank plate, 97, upon its pivot, 98. The plate is also pivoted on a pin, 99, secured to the lock bar. The lock bars are mounted upon the pivot plates, 97, at one end and similar pivot plates, 100, at their opposite ends. The plates, 100, however, are not actuated by a solenoid, but merely lift and shift the lock bars when the solenoid swings the plate 97 upwardly. This movement will lift the lock bar and shift it to the left, as seen in Figure 12 of the drawings. Then the lock bar will stand in the path of one of the teeth on the product dial stop bars and since there will only be one lock bar shifted into the path of the teeth of one stop bar at a time, it will be evident that the distance between the obstructing tooth, 91, on the lock bar, and the advancing shoulder, 101, on the stop bar will determine the amount of rotation which may be made by the product dial operatively connected therewith.

In order to allow the machine to be made as compactly as possible, and to permit two dials to operate simultaneously, the lock bars are of slightly different design, so that alternate stop bars will operate with alternate lock bars. This is why Figure 11 of the drawings shows two lock bars substantially between each shoulder and tooth on a stop bar. The operation, however, is the same in either case, and the lock bar solenoids will actuate the respective bars as desired, thus controlling the escapement of the product dial stop bars, and insuring that the dial in each column of the product may be automatically set and the desired numeral of the product displayed in the product display opening, 89.

Selector mechanism

Figure 4:
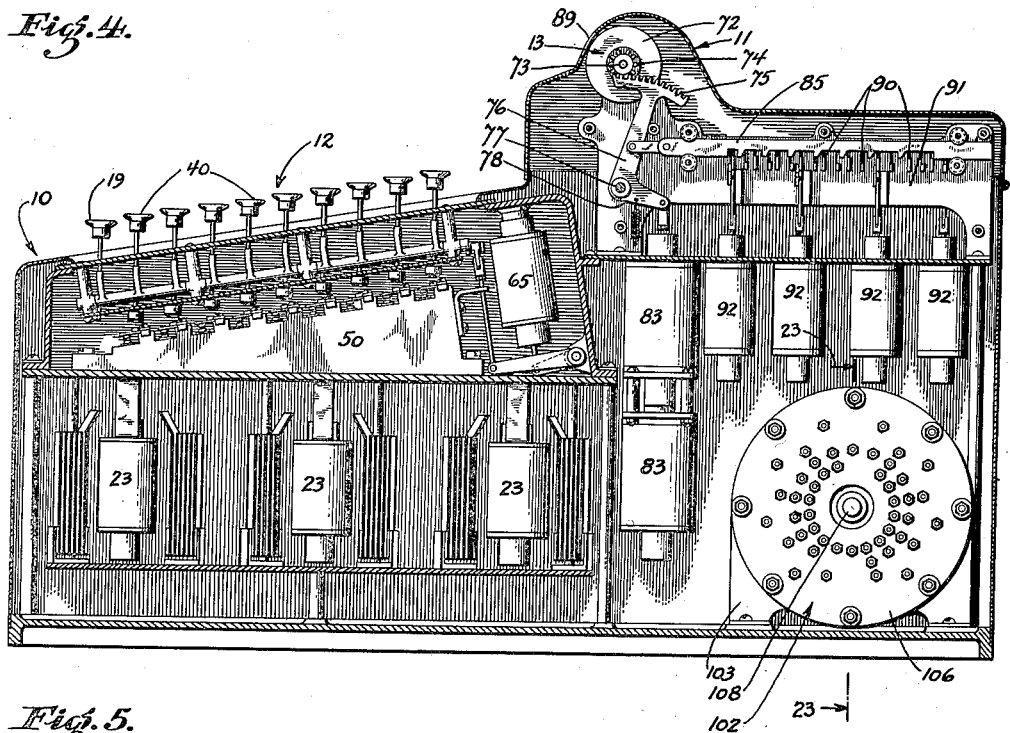
Figure 4 is a view in vertical section through the calculating machine, as seen on the line 4—4 of Figure 5, this view particularly disclosing one column of keys in the key bank, the mechanism operated thereby, as well as the mechanism by which the product dials are actuated.
Figure 5:
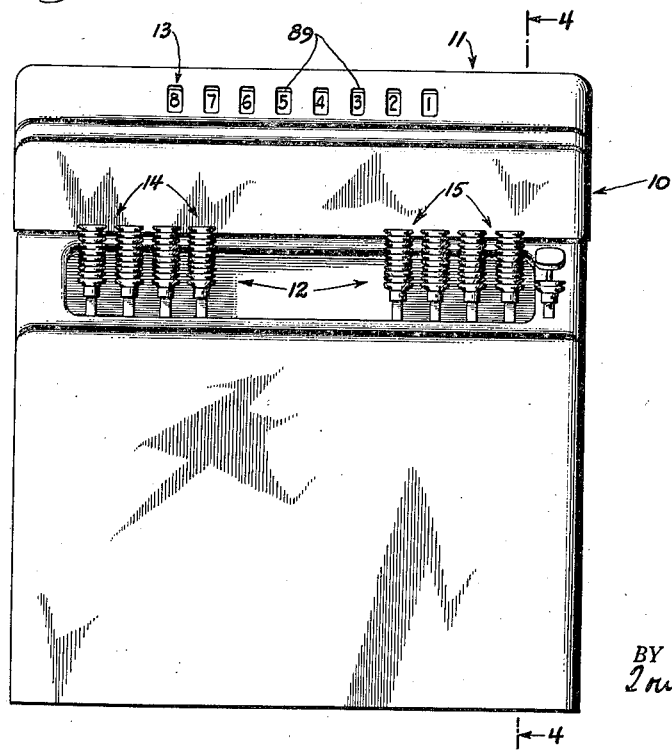
Figure 5 is a view in end elevation showing the complete calculating machine.

In Figure 4 of the drawings, a selector mechanism is generally indicated at 102. This mechanism is shown in detail in the drawings at Figures 19 to 22. The office of the selector mechanism is to finally close all of the circuits previously prepared by the setting of the keys in the multiplicand and multiplier banks and the resultant closing of the multiple switches, 71. In the operation of this machine, it is planned to obtain the answer by multiplication in one column at a time, although the product may be in two columns, as will be indicated in the following graphic manner:

```
      78
      59
      ——
      72 __ 9×8
      63 __ 9×7
      40 __ 5×8
      35
      ——
    4602
```

The calculating machine here disclosed proceeds with the multiplication in the foregoing manner, and this must be done progressively by the selector mechanism which closes the circuits originally prepared by the setting of the keys in the multiplicand and the multiplier banks, and which circuits when closed operate the lock bar solenoids and the product dial solenoids to cause determined figures to be set up on the product dials. This is entirely accomplished by the selector mechanism, 102, which comprises a suitable frame structure, 103, carrying disks, 104, 105 and 106, made of dielectric material. The frame 103 carries bearings 107, through which a shaft, 108, is mounted for rotation. The shaft 108 carries three disks, a disk 109 upon which contacts for a reversing solenoid switch and the key relay switches are carried, a disk, 111, upon which contacts for the product dial solenoid switches are carried, and a disk, 110, upon which contacts for the lock bar solenoid switches are carried. Each of the disks is fitted with a plurality of spring fingers, adapted to ride over contact members upon the fixed disks, 104, 105, and 106, respecively. The contacts may be conveniently arranged over the first of the disks, it being understood that they are so connected with the wiring as to insure that the contacts through the different circuits will progress in columns as represented on the product dials, and that by the time the selector switch disks have completed their rotation, all of the connections required to actuate the entire calculating mechanism will have been broken and the dials will have been set to disclose the correct numerals in the product as viewed through the product dial windows, 89.

*Selector switch mechanism*

When the machine is placed in operation, it is necessary to set the selector switch in motion to progressively complete the desired circuits and to solve the problem. The mechanism particularly concerned with this operation is shown in Figures 23 to 26 of the drawings. Here it will be seen that the clutch shaft, 115, is an extension of the selector shaft, 108. The clutch comprises a sleeve, 117, secured to the shaft, and a sleeve, 118, slidable on the sleeve 117 and limited in action by a nut 117a having a cylindrical extension therein. A helical spring, 119, is wound around the sleeve 118 and the cylindrical extension of nut 117a and acts as an expansion spring for a clutch structure, 120. This structure comprises a set of pins, 121, carried by a flange on the sleeve 116. This sleeve is slidable upon the sleeve 117 of the clutch. The sleeve 117 is pinned to the clutch shaft 115. The end of the sleeve 117 is formed with an enlarged portion, 123, through which pins, 121, slide. These pins may be brought to register with and project into openings, 124, in a complementary clutch flange, 125. The clutch flange has a hub portion, 126, through which a drive shaft, 127, extends. At the opposite end of this drive shaft is fitted a suitable gear, 128, here shown as in mesh with a gear, 129, carried upon a shaft, 130. The shaft extends through a bearing, 131, in the gear housing, 132, and is fitted at its outer end with a flange, 133, by which it may be directly connected to an electric motor or to other means whereby power may be transmitted to it. The shaft, 127, is connected to the hub, 126, by a flexible drive. This comprises a sleeve, 134, which is pinned to the shaft, 127, and around which sleeve a helical spring, 135, is wound. One end of this spring is secured by a screw, 136, to the sleeve 134 and the opposite end is secured by a screw, 137, to the clutch sleeve, 126. This arrangement makes it possible for the necessary degree of independent rotation to take place between shafts 108 and 127, in order to bring the parts of the clutch into proper operative relation to each other under certain conditions.

The clutch member, 120, is initially locked against rotation in a predetermined starting position, so that the selector switch mechanism will always begin operating with the units column product dial so that it will be insured that the progressive accumulation of product digits will begin with those in the units column. This lock mechanism comprises a pawl, 138, which is mounted on a shaft, 139. The pawl swings in the same plane as the longitudinal axis of the clutch and normally seats itself in a groove, 140, formed in the edge of the clutch flange, 123, thus preventing the flange from rotating. Mounted upon the shaft, 139, and secured thereto is a lever arm, 141, connected by a link, 142, to an arm of a bell crank, 143. The opposite arm of the bell crank is fitted with a shifting pin, 144, adapted to engage the clutch sleeve, 118, and to shift this sleeve longitudinally. It will therefore be evident that by rotation of shaft 139 to swing the pawl, 138, out of its slot 140 in the clutch flange, 123, the bell crank arm 143 will simultaneously shift the clutch sleeve 118 on the sleeve 117 and bring the pins 121 into register with the openings 124 in the flange 125 of the clutch sleeve 126. This operation is brought about by swinging the pawl 138 to its released position, so that the spring 119 will force the clutch member forwardly and cause the pins 121 to register with the openings 124. This action is produced by a starting solenoid, 148, which is fitted with a plunger, 149. This plunger connects with an arm, 150, which arm is secured to a release shaft, 151. The shaft is carried in bearings on the frame members, 146 and 147, and at its opposite end from the mounting of the lever 150' it is fitted with a starting pawl, 151'. The end of this pawl is bent downwardly to form a tooth, which extends into a recess, 152, in a lock disk, 153. The disk 153 is fastened onto the shaft 139, carrying the clutch lock pawl, 138. Thus, by swinging the starting pawl upwardly to disengage it from the disk 153 the spring 119 may actuate the clutch.

The driving action of the machine may be interrupted and the selector switch may be stopped and set for subsequent operation by the initial actuation of a stop solenoid, 154. This solenoid carries a plunger, 155, connected to a stop arm 156. The arm is yieldably mounted on the shaft, 139, and acts to swing the pawl 138 into the slot 140 in the clutch flange 123. This will simultaneously cause the clutch pins to be withdrawn from the openings 124 to disconnect shaft 108 from shaft 127.

Reversing switch

Figure 18:
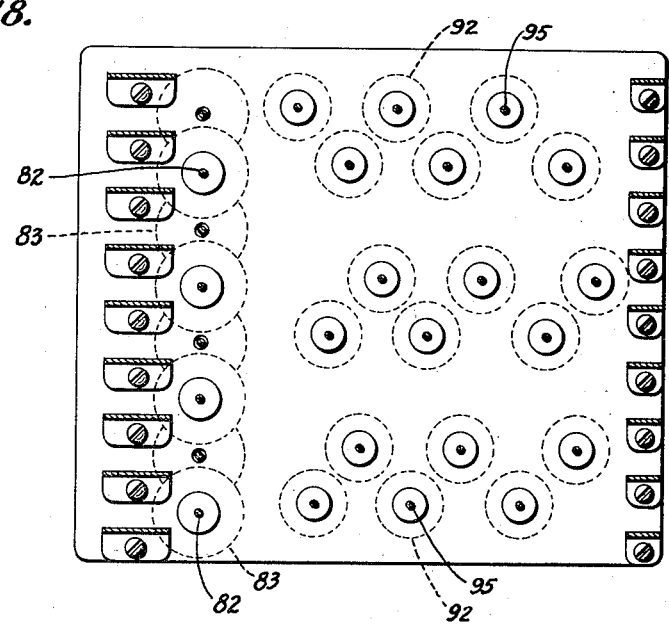
Figure 18 is a view in plan showing the product dial mechanism as seen on the line 18—18 of Figure 11.
Figure 19:
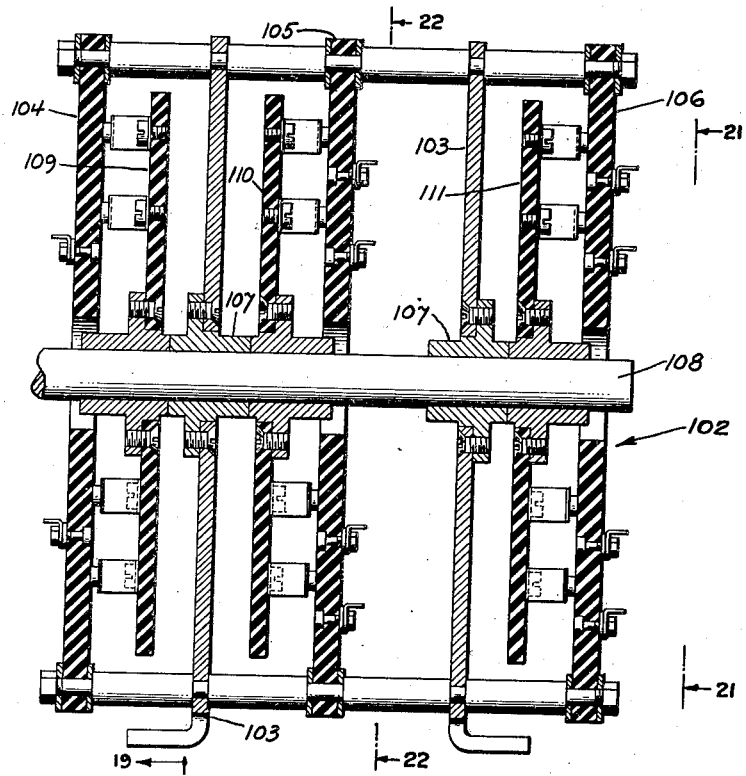
Figure 19 is a view in central vertical section through the selector switch as seen in the direction of the arrow 19—19 in Figure 20.
Figure 20:
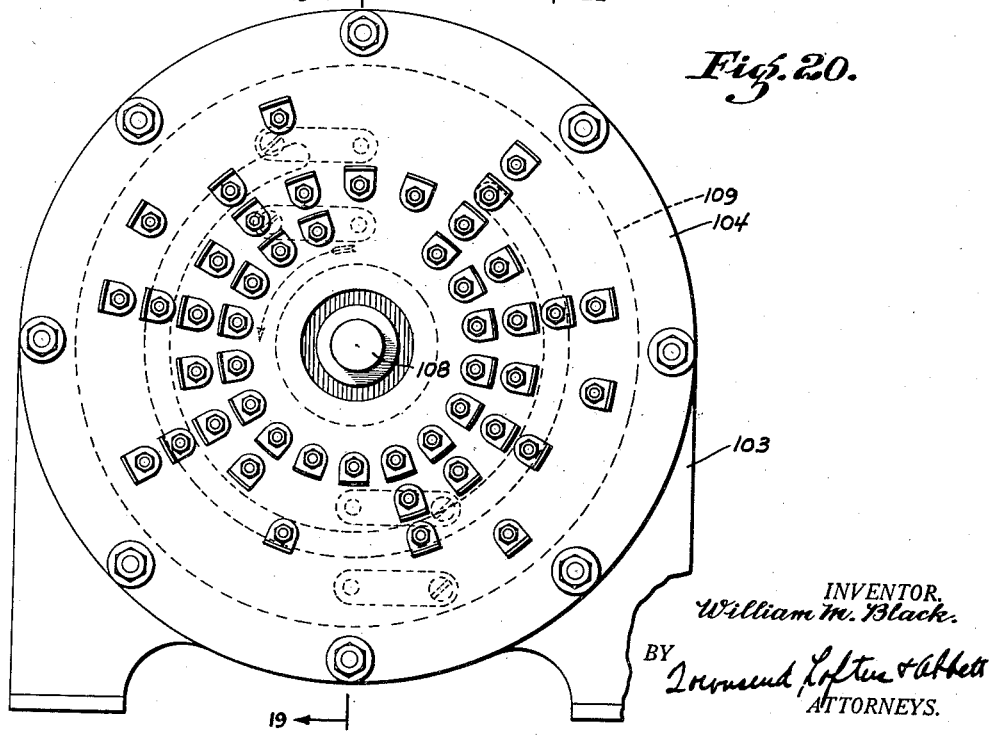
Figure 20 is a view in end elevation showing the selector switch.
Figure 21:
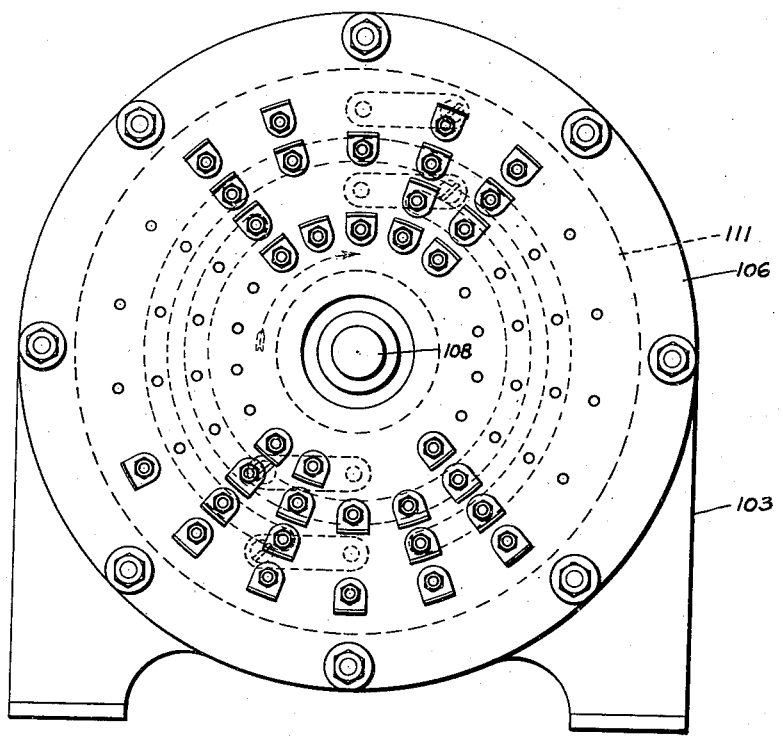
Figure 21 is a view in end elevation of the selector switch, as seen on the line 21—21 of Figure 19, and particularly discloses the switches for all the product dial mechanisms.
Figure 22:
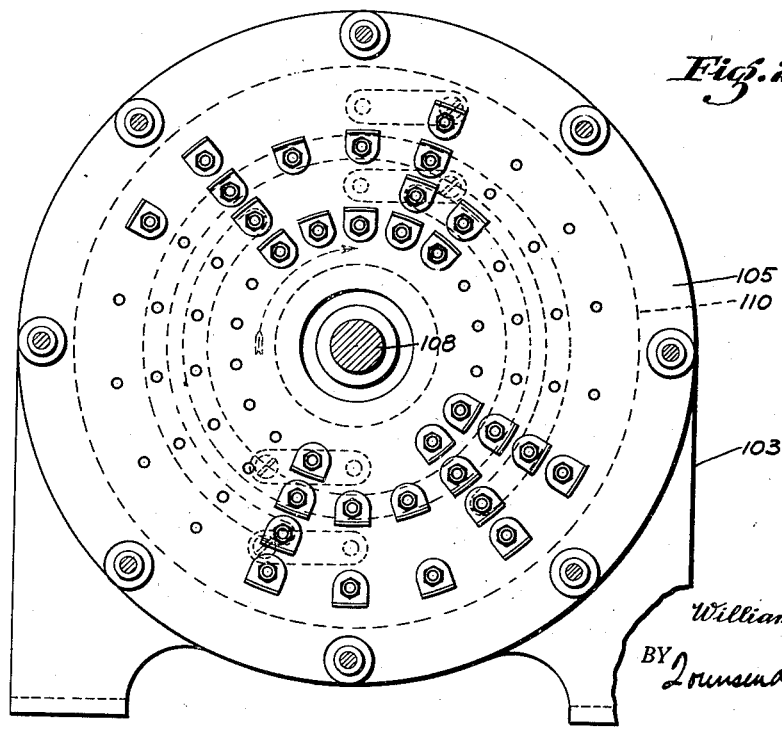
Figure 22 is a view in vertical section through the selector switch, as seen on the line 22—22 of Figure 19, and particularly discloses the switches for all the lock bar solenoid mechanisms.

In order to insure that progression will take place in the multiplication and that the figures will be set over into the desired columns as the multiplication proceeds, as indicated in the examples set out in the foregoing description, it is necessary to provide a reversing switch which will alternately reverse the sequence of operation of the lock bar solenoids. These solenoids, as shown in Figure 18 of the drawings, are in pairs. This is further indicated in the diagram of Figure 3b of the drawings. The reversing switch is also shown in this diagram. The circuits connected therewith will not be described at this point in the specification, but the operating mechanism is there shown as including a solenoid, 158, actuating a lever, 159, normally held in one position by a spring, 160. This lever is connected with reversing shafts, 161 and 162 carrying a plurality of contacts, which may be alternately brought to bear upon sets of contact points carried upon and insulated therefrom as the shafts 161 and 162 are reciprocated. This action will cause alternate circuits to be established through either the right or left hand set of lock bar solenoids, thus bringing about the desired solenoid energization.

Wiring arrangement

Referring particularly to Figures 2, 3a, 3b and 3c of the drawings, the operation of the apparatus is as follows:

The driving motor, 163, is connected with lead wires, 164 and 165. The circuit through these wires is controlled by a switch, 166. Main feed wires, 167 and 168, connect with the lead wires. The operating key, 16, is provided with a contact, 169. The manual release key, 18, designed to release all the keys is provided with a contact member, 170. The interlocking key 17, is provided with a contact maker, 171. One contact point of the operating key switch, 16, is connected with the main lead wire, 164, by a wire, 172. The other contact point of this switch is provided with a wire, 173, which leads to one side of the operating solenoid 148. The circuit is completed from this solenoid through a wire 174, which connects with main feed wire 167. The manual key release, 18, is provided with a conductor, 175, which connects with wire 172 and the lead wire 164. The opposite contact point of the manual key release 18 is provided with a conductor, 176, which leads to the key release solenoid 65. The other side of the key release solenoid is fitted with a wire, 177, which connects with the main feed wire 167. The interlocking key, 17, is connected with the lead wire 176, from the manual key release by a wire 178.

The opposite contact of the interlocking key 17 is fitted with a conductor 179, which leads to a contact point, 180, on the selector switch. The circuit is completed through a contact maker, 181, carried upon the selector arm 182.

At this point in the description it should be explained that in order to trace all of the circuits through the selector switch, the movable disks 109, 110 and 111 have been diagrammatically indicated in Figure 3a as a moving selector arm 182 upon which arm the brush contacts of all the disks are indicated as being carried. The contacts on the frame members 104, 105 and 106 are shown as concentrically grouped around the axis of the arm 182. However, in the description the exact locations of the parts upon Figures 19, 20, 21 and 22 will be given. Contact is then made with a collector bar, 183, after which the circuit is completed to the main feed wire 168.

The multiplier and multiplicand key banks are supplied with current as follows:

Feed wire 168 connects with a wire 185. This wire extends to one side of the No. 1 multiplier relay solenoid 23. The opposite wire from this solenoid is indicated at 186 and leads to one contact of each of the No. 1 multiplier keys, 15. The No. 1 key circuits in the multiplier key bank are partially completed when the keys are depressed and the keys in each column partially close separate circuits for the columns. The circuit through the No. 1 key switch in the multiplier bank, which key is in the units column, is completed along a bus bar, 187, which connects through a wire 188 with a collector bar, 189, on the member 104 of the selector switch. The circuit is completed through a contact maker, 190, on the disk, 109, and thence through the member 191 to the return wire, 192, which connects with the feed wire 167. The No. 1 key circuit in the multiplier bank—which key is in the tens column—is completed from the wire 186 through the switch of the No. 1 key, to a bus bar, 193, and thence along wire 194 to a collector bar, 195, carried on frame member 104 of the selector switch. The circuit is completed through the collector bar 191 to contact 190, carried on disk 109 of the selector switch, after which the circuit is completed through return wire 192 to the feed wire 167.

The circuit of the No. 1 key switch in the hundreds column of the multiplier key bank is completed from wire 186 through the key switch to the bus bar 196, and thence along a conductor 197 to a collector bar, 198, carried on the frame member 104 of the selector switch. The circuit is completed through the contact member 190 to the collector bar, 191, and thence along return wire 192 to the feed wire 167.

The No. 1 key in the thousandths column of the multiplier bank completes a circuit through wire 186 to the switch of this key and thence to a bus bar, 199, to a wire 200. This wire leads to a collector bar, 201, on the frame member 104. This circuit is completed through the contact member 190 carried on the disk 109 of the selector switch, the current then flowing along return wire 192 to the feed wire 167.

The circuits to the switches of the No. 2 keys in the multiplier bank are established from the feed wire 168 to a wire 202, which connects with the multiplier key relay solenoid, 23, of the No. 2 key. The other wire from this solenoid as indicated at 203 connects individually with one contact of each of the No. 2 keys in the multiplier bank. The other contacts are individually connected with their respective bus bars for their particular columns, the bus bars being numbered 187, 193, 196 and 199.

The circuit to the multiplier key relay of the No. 3 keys in the multiplier bank is established by wire 202 which connects with the feed wire 168 at one end and with the solenoid of the No. 3 key at its opposite end. The opposite connection of the solenoid is provided with a conductor, 204, leading to one contact of each of the No. 3 key switches in the multiplier bank. The other contacts of these switches are individually connected to their respective column bus bars, 187, 193, 196 and 199.

The circuit through the multiplier key relay solenoid controlled by the No. 4 keys in the multiplier key bank is completed from the feed wire 168 along a wire, 205, to the solenoid, and thence along a wire 206 to one side of each of the No. 4 multiplier key switches, the other sides of the switches being connected with their respective bus bars.

The multiplier key relay solenoid of the No. 5 keys in the multiplier bank are provided with current from wire 168 through wire 205 connected to the No. 5 solenoid, thence by wire 207 to one side of the No. 5 key switches, and thence to the respective bus bars of the keys.

The No. 6 multiplier key relay solenoid is energized through wire 208 to the solenoid of the No. 6 keys and thence along wire 209 to one side of each of the No. 6 key switches in the multiplier bank, the circuits being completed through the respective bus bars of the keys.

The No. 7 multiplier key relay solenoid is connected with the feed wire 168 by the wire 208, the circuit then continuing along the wire 210 to one side of the No. 7 switches and then being completed through the bus bars.

The No. 8 multiplier key relay solenoid connects with feed wire 168 by wire 211 and thence along wire 212 to one side of each of the No. 8 multiplier key switches, the circuit being completed through the bus bars of the respective columns.

The No. 9 multiplier key relay solenoid receives current from feed wire 168 along wire 211, through the solenoid, thence along wire 213 to one side of each of the No. 9 key switches, the circuit being completed through the respective column bus bars.

The multiplicand bank of keys is supplied with current in the same general manner as that previously described for the multiplier bank of keys, although different circuits are finally established and controlled by the operation of the selector switch.

The circuit to the No. 1 multiplicand key relay solenoid is established from feed wire 168 by wire 214 leading to the solenoid of the No. 1 key bank, thence through the No. 1 multiplicand solenoid along a wire 215 to one side of each of the No. 1 multiplicand keys. The units column circuit is completed through the No. 1 unit switch along a bus bar 216 and thence along wire 217 to a distributor wire, 218, which connects with contacts 219, 220 and 221 and 222. These contacts are carried on the frame member, 104, of the selector switch, and are so disposed as to permit a circuit to be completed through the contact member 190 on disk 109, to the collector ring 191, and thence returning along wire 192 to the return feed wire 167.

The No. 1 multiplicand key switch in the tens column completes a circuit from wire 215 through the key switch to bus bar 223, and thence along a conductor 224 to a distributor wire, 225. This wire individually connects with contact members 226, 227, 228 and 229. Mounted on frame member 104 of the selector switch the circuits from each of these contacts are completed by the contact member 190 carried on the disk 109 of the selector switch, and which causes circuits to be completed to the collector bar 191, and thence along wire 192 to the return feed wire 167.

The No. 1 key switch in the hundreds column of the multiplicand bank completes a circuit from the wire 215 to bus bar 230 and to a conductor 231. This wire leads to a distributor wire, 232, which connects with contact members 233, 234, 235 and 236 on frame member 104. The circuits from these contacts may then be completed through the contact member 190 carried on the disk 109, and thence along collector bar 191 to the conductor 192, which connects with the return feed wire 167.

The No. 1 key switch in the thousandths column of the multiplicand bank completes a circuit from wire 215 through the No. 1 key switch, thence through the switch to bus bar 237, and then along wire 238 to distributor wire 239. This wire connects with contact members 240, 241, 242 and 243 on frame 104. Circuits may be completed from these contact members through the contact maker 190 carried on the disk 109, and thence along the collector bar 191 to the conductor 192 and the return feed wire 167.

The multiplicand key relay solenoid of the No. 2 keys in the multiplicand bank is in the following circuit:

A conductor, 244, connects one side of the solenoid with the main feed wire 168. The other side of the solenoid is provided with a wire, 245, connecting with one side of all of the No. 2 switches in the multiplicand bank. The other sides of the No. 2 switches are separately connected with their respective bus bars, Nos. 216, 223, 230 and 237.

The No. 3 multiplicand key relay solenoid is connected to the feed wire 168 by the wire 244, the opposite side of the solenoid being provided with a wire, 246, which connects with one side of each of the No. 3 multiplicand solenoid switches. The opposite sides of these switches are respectively connected to the column bus bars.

The No. 4 multiplicand key relay solenoid is connected with the feed wire 168 by a wire 247. The opposite side of this solenoid is provided with a wire, 248, connecting with one side of each of the No. 4 multiplicand key bank switches. The opposite side of each of these switches is connected with its respective column bus bar.

The No. 5 multiplicand key relay solenoid is connected with the wire 247, the opposite side of this solenoid being provided with a wire, 249, which leads to one side of the No. 5 multiplicand key switches. The opposite sides of these switches are connected with their respective column bus bars.

The No. 6 multiplicand key relay solenoid is connected with the wire 168 by a wire 250, the opposite side of this solenoid being connected with the wire 251. This wire connects with one side of each of the No. 6 multiplicand key switches. The opposite sides of each of these switches are connected with their respective column bus bars.

The No. 7 multiplicand key relay solenoid is connected with the feed wire 168 by the wire 250. The circuit continues from the solenoid along wire 252 to one side of the No. 7 multiplicand key switches. The opposite sides of these switches are connected with their respective column bus bars.

The No. 8 multiplicand key relay solenoid is connected with the feed wire 168 by the wire 253. The opposite side of this solenoid is connected with one side of each of the No. 8 key switches by conductor 254.

The No. 9 key relay solenoid connects with wire 253 on one side and on the opposite side with wire 255. This wire is connected to one side of all of the multiplicand key switches. The opposite sides of these switches connect with their respective column bus bars.

It will thus be evident from the description of the foregoing circuits that the multiplier and multiplicand keys each control simple separate primary circuits, and it will be apparent as the description proceeds that the co-operative action of the two primary circuits will affect one secondary circuit to complete the calculating operation.

*Product dial apparatus*

The secondary circuits of the apparatus are partially closed by the action of the respective keys in the key banks when they close the circuits of the key relay solenoids. These solenoids, as previously described, operate to individually close nine circuits simultaneously, as the plunger of the particular solenoid affected is moved to deflect the various switch fingers 69 and 70 of the key relay solenoid switches.

The secondary circuits are completed by connecting the feed wire 168 with the lead wire 164. This feed wire connects with a distributor bar, 183, thence continuing along a contact maker 181, carried by the disk 110 of the selector switch. The current passes through the member 181 to contact 256, which is mounted upon the frame member 105. The contact point 256 is provided with a wire 257 which leads to the units column product dial solenoid 83. The opposite side of this solenoid is connected with a wire, 258, leading to a distributor wire, 259, connected with product bar contacts 260 to 275, inclusive. These contacts are mounted on frame member 106 and are engaged by the contact maker. The circuit may then continue from any one of these contacts through circuit maker 276 carried by disk 111 of the selector switch. This contact maker also engages a collector bar, 277. This bar is provided with a conductor, 278, which leads to one side of the right-hand set of lock bar solenoids hereafter indicated as "R—92". It is to be understood that the solenoids indicated as "R—92" control the dial stop bars of the odd numbered columns of the product dials, and that the solenoids "L—92" control the stop bars of the even numbered columns of the product dials. Reference to Figures 3a and 3b will show that the lock bar solenoids are on separate circuits, the lock bar solenoids "R—92" being all connected on one side with wire 278.

The zero lock bar solenoid of the R—92 group is fitted with a conductor, 279, which leads to two units of the reversing switch. By reference to Figure 3b of the drawings, it will be seen that the reversing switch constitutes two sets of contact makers for each of the lock bar circuits, the circuits to be made and broken by the contacts shown which act to directly connect the lock bar circuits with the key relay solenoid circuits, in which event the R—92 lock bars will be directly connected with the multiplier key relay solenoid secondary circuits and the L—92 lock bar circuits will be directly connected with the multiplicand key relay solenoid secondary circuits. When, however, the reversing solenoid 158 is actuated to shift the reversing rods 161 and 162 in the direction of the arrows —a—, as indicated in Figure 3b, the direct connection will be broken and the R—92 lock bar solenoids will be connected with the secondary circuits of the multiplicand key relay solenoids, and the L—92 lock bar solenoid circuits will be directly connected with the multiplier key relay solenoid secondary circuits, this being necessary in order to insure that the successive multiplications of numbers set up in the multiplier and multiplicand banks will properly fall in the correct columns on the product dials, this being especially due to the fact that as normally set up the R—92 lock bar relays actuate the odd column product dials, and that the L—92 relays actuate the even product column dials. The actual manner in which this operation is brought about and the reason therefor will be apparent when a problem is worked out in detail, as will be hereinafter the case. The wire 279 leading from the zero lock bar solenoid R—92 connects with a contact, 280, through a wire, 281. A switch member, 282, completes this circuit to a contact, 283, after which wire 284 leads the current to a reversing contact, 285, of the switch. A wire, 286, connects with the reverse contact 285. This wire leads to the zero bus bar, 287, in the multiplier unit, which bus bar is fitted with a plurality of conductors, 288, which connect the zero bus bar 287 with several of the zero contacts in the multiplier key relay solenoid switches. These contacts will not be designated by reference numerals, but may be located by the following formula.

Whenever the product of the key numeral and the secondary contact numeral of that respective key relay solenoid switch is a number the units digit of which is zero, the wire 288 will connect the zero bus bar with one of the contacts necessary to complete the secondary circuit through the switch unit represented by the multiplicand numeral, assuming for the moment that the key numeral is the multiplier.

Assuming a simple multiplication of 5 in the multiplier bank times 4 in the multiplicand bank, the secondary circuit from the No. 4 contact on the No. 5 key relay solenoid switch in the multiplier bank will be connected by a conductor, 289, to the No. 5 contact on the No. 4 multiplicand key relay solenoid switch, as shown in dotted lines, Figure 3c. This circuit will then be completed through No. 4 multiplicand key relay solenoid switch to conductor 290, and from thence to the No. 2 bus bar, 291, connected with the No. 2 lead wire of the L—92 bank of lock bar solenoids. The lead wire is designated as 292 and connects with reversing contact 293, which contact is also connected with a cross wire, 294, leading to a contact, 295, of the straight side of the reversing switch. A switch blade, 296, completes a circuit to the contact 297, which is connected by a wire, 298, to the No. 2 lead wire, 299. This wire connects with one side of the No. 2 lock bar solenoids in the L—92 bank. The circuit is then completed to bus bar 300, which is connected by a wire, 301, to a collector bar, 302, on frame member 106 of the selector switch, a circuit then being completed through contact maker 303 carried on the selector switch disk 111 to any one of a series of contacts, 304 to 319, inclusive. These contacts all connect with a common distributor wire, 320, to which wire is secured a wire, 321. This wire leads to one side of the even column product dial solenoids, the second column product dial solenoid circuit being completed from a wire, 321, through wire, 322, which leads to a pair of contacts, 323 and 324, on the frame member 105 of the selector switch. A contact is then made through contact maker 325 carried on the disk 10 of the selector switch, which circuit continues through a collector bar, 326, to the wire 192 leading to the feed wire 167.

The circuit through the fourth column product dial solenoid, 83, is continued from wire 321 along wire 327 to a distributor wire, 328. This wire connects with a wire, 329, which is secured to contacts 330 and 331, carried on the frame member, 105, of the selector switch. Contact is made with the collector bar, 326, the circuit being completed by contact maker 325 carried by the disk 110, after which the circuit continues along 167.

The circuit through the sixth column product dial solenoid continues from the wire 321 through the solenoid to wire 332 and thence to a distributor wire 333 in the selector switch. This wire 332 connects with a wire 334, which is secured to a contact, 335 on the frame member 105 of the selector switch. The distributor wire 333 is also connected with a wire 336 which is secured to contacts 337 and 338 carried on the frame member 105 of the selector switch. The distributor wire 333 also connects with wire 339, which is secured to contacts 340 and 341. Circuits are completed through contacts 335, 337, 338, 340 and 341, through contact maker 325 carried on the disk 10 of the selector switch, the circuits then continuing through the collector bar 326 along wire 167.

The circuit of the product dial solenoid 83 in the eighth column of the product is completed from wire 321 through the solenoid to wire 342. This wire connects with a distributor wire, 343, in the selector switch. The distributor wire connects with a wire, 344, secured to a contact, 345, carried on the frame member, 105, of the selector switch. A circuit may then be completed by contact maker 325 through the collector bar 326, and thence along conductor 167.

The foregoing description traces the complete secondary circuit through a simple operation of multiplication as set up by the No. 4 key in the multiplicand bank of keys and the No. 5 key in the multiplier bank of keys, and through the zero lock bar solenoid of the R—92 bank of lock bars to and through the units column solenoid of the product dial mechanism and the No. 2 lock bar solenoid of the L—92 bank of lock bars through the tens column product dial solenoid, to produce a product of 20 on the dials. In addition, all of the available circuits through the No. 2 lock bar solenoid of the L—92 bank have been traced through all of the even product dial solenoids.

The circuits of the odd column product dial solenoids, 83, other than the previously described units column solenoid circuit, will now be described.

One side of all the odd column product dial solenoids connects with bus bar 258. The circuits through the hundreds column solenoid continues from bus bar 258 along wire 346 to a distributor wire 347. This wire connects with wires 348, 349 and 350. The wire 348 connects with contacts 351 and 352. The wire 349 connects with contacts 353 and 354, and the wire 350 connects with contact 355. Circuits are completed from all of these contacts through contact maker 181 to collector bar 183 and thence to feed wire 168.

The circuit through the fifth column of the product dials or the tens thousands column is completed through a wire 356 to distributor 357, and thence to a wire 358, to a contact 359; wire 360 to contacts 361 and 362; wire 363 connects the wire 357 with contacts 364 and 365. Wire 366 connects the distributor wire 357 with contacts 367 and 368. A circuit is completed through this series of contacts to the distributor bar 183 by contact maker 181, carried on the selector switch disk 110, the current then flowing along to the feed wire 168.

The circuit from the seventh column dial, or the millions column, is completed from the bus bar 258 along wire 369 to a distributor wire 370 it being understood that all contacts from No. 7 up to the stop solenoid contact 180 will be skipped in operation of this dial. The distributor wire connects with a wire 371 on the selector switch, and to which a contact 372 is connected. A wire, 373, connects the distributor wire 370 with contacts 375 and 376. Circuits are completed through this set of contacts to the collector bar, 183, by the contact maker 181, mounted on selector switch disk 110, and the current then continues its flow along feed wire 168.

In order to give examples of the secondary circuits without unnecessarily complicating and confusing the drawing and description, the secondary circuits involving No. 9 as a multiplier and Nos. 1 to 9 as multiplicands, have been completed from the No. 9 multiplier key solenoid through the various solenoids of the multiplicand key bank by dotted lines as shown in Figure 3c of the drawings. It will be understood that all of the other multiplier key solenoid switches are interconnected in the same manner, as indicated by the dotted lines in Figure 3c, and according to the same underlying principle, although these other circuits have not been shown.

As previously explained, the bus bar 278 connects with one side of all of the R—92 lock bar solenoids, and, as will be hereinafter discovered, the lock bar solenoids numbered 0 to 8, inclusive, lead to contacts 0 to 8, inclusive, of each of the multiplier key solenoid switches, with exception of the previously described 0 lock bar circuit. These circuits as controlled by the Number 9 multiplier key will now be described.

The No. 1 lock bar solenoid in the R—92 bank is connected with the bus bar 278 on one side and with a wire, 377, on the other side. This wire is provided with a conductor, 378, secured to a contact, 379, of the reversing switch. A switch blade, 380, completes a circuit to a contact, 381, after which a wire, 382, leads to a contact, 383, on the reverse side of the reversing switch.

A wire connects the contacts 383 and leads to the No. 1 bus bar 385, which wires are connected to the multiplier key relay switches that indicate the unit number of the multiple; that is 1×1=1, 1×2=2, 1×3=3, etc., which represent the secondary circuits of the multiplier bank of key relay switches.

The No. 2 lock bar solenoid of the R—92 bank of lock bars is connected with the bus bar 278 on one side, and with a wire, 386, on the other side. A wire, 387, is connected therewith. This wire is secured to a contact member 388 which may be engaged by a switch blade, 389, to complete a circuit to a contact 390. Contact 390 connects with a reverse contact, 391, by a wire 392. The reverse contact, 391, is provided with a wire, 393, which connects with the No. 2 bus bar 394 of the multiplier bank of key relay solenoid switches.

The No. 3 lock bar solenoid of the R—92 bank connects on one side with the bus bar 278 and on the opposite side with the wire 395. This wire extends to the reversing switch and is connected therewith by a wire, 396, which is secured to a contact 397. A circuit is completed from this contact by a switch blade, 398, adapted to engage a contact 399. A wire, 400, connects this contact with a reverse contact, 401. A wire, 402, connects the reverse contact with the No. 3 bus bar, 403, of the multiplier key bank switches. The No. 3 contacts of the various multiplier key relay switches are connected with the No. 3 bus bar, 403, and conductors, 404. These contacts of the multiplier bank which multiple terminates with the digit 3 are connected to bus bar 403; that is, $3 \times 1 = 3$, $1 \times 3 = 3$, $9 \times 7 = 63$, etc.

The No. 4 lock bar solenoid of the R—92 bank connects with the bus bar 278 on one side and with a wire, 405, on its opposite side. This wire leads to the reversing switch, and is connected therewith by a wire, 406, which is secured to a contact, 407. A switch blade, 408, completes the circuit to a contact 409. A wire, 410, connects the contact 409 with a reverse contact, 411. This contact is provided with a wire, 412, leading to the No. 4 bus bar, 413, of the multiplier key bank. The No. 4 switches of the multiplier key relay switches are connected to the No. 4 bus bar, 413, and conductors, 414 the contacts of the various No. 4 key relay switches in the multiplier bank which terminate with the digit 4 in the product and connected to the bus bar 413, for example; $1 \times 4 = 4$; $8 \times 8 = 64$.

The No. 5 lock bar solenoid of the R—92 bank is connected on one side with the bus bar 278, and on the other side with a conductor 415. This wire connects with the reversing switch through a wire, 416, which wire is secured to a contact member, 417, as switch blade 418 completes a circuit to a contact 419, the circuit then continuing along a wire, 420, to a reverse contact, 421, and thence along conductor 422 to a No. 5 bus bar, 423, of the multiplier key relay switches.

Conductors 424 connect the bus bar with the No. 5 contacts of several multiplier key relay switches. These conductors connect the No. 5 bus bar 423 with the multiplier bank of key relay switches that terminate with the digit 5 in the product; for example, $1 \times 5 = 5$, $5 \times 5 = 25$.

The No. 6 lock bar solenoid of the R—92 bank is connected on one side with the bus bar 278, and on the other side with a wire, 425. This wire is connected to a wire, 426, which is secured to a contact member, 427, through which a circuit is made to a switch blade, 428, and thence to a contact, 429.

A wire, 430, connects this contact with a reverse switch contact, 431, the circuit then continuing through a wire, 432, to the No. 6 bus bar, 433. Some of the contacts of the No. 6 multiplier key relay switches are connected with the No 6 bus bar, 433, by conductors 434. In this case the contacts of the various multiplier bank of key relay switches that terminate with the digit 6 in the product, are connected to the bus bar 433 by conductor 434, for example; $1 \times 6 = 6$, $2 \times 8 = 16$.

The No. 7 lock bar solenoid of the R—92 bank is connected on one side with the wire 278, and on the other side with the wire 435. This wire is secured to the reversing switch by a wire, 436, which connects with a contact 437. A switch blade, 438, completes the circuit to a contact, 439, the circuit then continuing along the wire 440 to a reverse contact, 441. A wire, 442, connects with this contact at one end and with the No. 7 bus bar of the multiplier key relays, as indicated at 443.

Wires connect the bus bar 443 with the contacts of the various multiplier bank of key relay switches that terminate with the digit 7 in the product, as, for example; $1 \times 7 = 7$, $3 \times 9 = 27$.

The No. 8 lock bar solenoid of the R—92 bank connnects at one side with the bus bar 278 and on the opposite side with the wire 445. This wire leads to the reversing switch and is connected therewith by wire 446, which also connects with a contact, 447. Switch blade, 448, completes the circuit to a contact 449. The circuit continues along wire 450 to a reverse contact, 451. A wire, 452, connects this contact with the No. 8 bus bar, 453. Wires connect the bus bar 453 of the No. 8 lock bar solenoid with contacts of the multiplier bank of key relay switches which terminate with the digit 8 in the product; for example, $1 \times 8 = 8$, $9 \times 2 = 18$.

When it is intended that a dial shall make a sufficient revolution to register a numeral 9 in the product it is planned that the lock bars shall not restrict the movement of the stop bar involved, and in that event the amount of current which would have otherwise passed through a lock bar solenoid to energize the same must be passed through suitable resistance in order to maintain constant current flow in the apparatus. For this purpose, the resistance coil indicated in the R—92 group as the "No. 9 coil" does not operate as a solenoid, but as a resistance having a value equal to that of any one of the lock bar solenoids. This resistance coil connects with the bus bar 278 on one side and with wire 455 on the opposite side. This wire leads to the reversing switch, to which it is connected by a wire 456. A contact 457 is secured to the wire. A switch blade, 458, completes the current to a contact 459, after which the current flows along wire 460 to a reverse contact 461. A wire, 462, then carries the current to the No. 9 bus bar, 463, of the multiplier key relay switches.

Wires from the bus bar 463 of the No. 9 connect with contact of the multiplier key relay switches which terminate with the digit 9 in a product, that is; $1 \times 9 = 9$, $7 \times 7 = 49$.

In order to thoroughly understand the operation of the machine with which the invention is concerned, and particularly the manner in which numerals in two columns on the product dials are set up to give a desired product, it should be explained that a lock bar solenoid of the R—92 bank of lock bars, and a lock bar solenoid of the L—92 bank of lock bars are selectively placed in a pre-determined circuit controlled by the setting of a key on the multiplier bank and a key on the multiplicand bank.

The circuits of the lock bar solenoids have been pre-arranged so that the lock bar solenoid of the R—92 bank will represent the right-hand numeral of the product, and the circuit, including the lock bar solenoid of the L—92 bank, will represent the left-hand numeral of the product obtained in the particular multiplication of a numeral represented by one key on the multiplier bank and one key on the multiplicand bank. This interrelation of predetermined circuits is established by the electrical connections formed between the relay switches of the multiplier key banks and the relay switches of the multiplicand key banks. The respective circuits completed through the No. 9 multiplier key relay switch from the bus bars 385, 394, 403, 413, 423, 433, 443, 453 and 463 will now be traced through the No. 9 multiplier key relay switch to the multiplicand key relay switches affected thereby, and thence through the R—92 bank of lock bars to the product dial solenoids.

The bus bar 385' which establishes connection from the multiplier key bank to the No. 1 lock bar solenoid is connected by a wire, 385, to a contact of the No. 9 section of the No. 9 multiplier key relay switch. A circuit will then be completed through this section of the switch to a wire 465, which leads to the No. 9 section of the No. 9 multiplicand key relay switch. A circuit may then be completed through this section of the No. 9 multiplicand key relay switch along a wire 467 over the No. 8 lock bar solenoid of the L—92 bank. It will thus be seen that in the multiplication of 9×9 the No. 1 solenoid of the R—92 bank will be connected in series with the No. 8 solenoid of the L—92 bank, thus giving the answer of 81. The circuit through the No. 8 solenoid of the L—92 bank continues as follows: Along wire 467 to reverse contact 468 of the left-hand section of the reversing switch. A wire, 469, leads from this contact to a contact 470, from which a circuit is completed along switch blade 471 to contact 472. A wire 473 connects this contact with wire 474 leading to one side of the No. 8 lock bar solenoid in the L—92 bank. The circuit is then completed through the bus bar 300.

The circuit from bus bar 394', which connects the No. 2 lock bar solenoid of the R—92 bank with the multiplier bank of relay switches, is provided with a wire 394, which is connected with one contact of the No. 8 section of the No. 9 multiplier key relay switch. A circuit is then completed along wire 475, as indicated in dotted lines in Figure 3c. This wire connects to the No. 9 switch section of the No. 8 multiplicand key relay switch. A circuit is completed through this section of the switch to a wire 476 leading to bus bar 477. This bus bar is indirectly connected with the No. 7 lock bar solenoid of the L—92 bank by being secured to reverse contact 478 of the reversing switch. A wire, 479, connects this contact with a contact 480, the circuit being completed through switch blade 481 to contact 482, and thence along wire 483 to wire 484 which connects with one side of the No. 7 lock bar solenoid in the L—92 bank, the opposite side being secured to the bus bar 300.

The connections from lock bar solenoid No. 3 in the R—92 bank to the lock bar solenoid No. 6 in the L—92 bank through the No. 9 multiplier key relay switch, is as follows:

A wire 403 connects the bus bar 404 with the No. 7 section of the No. 9 multiplier key relay switch. The circuit then is completed through wire 485 (indicated in dotted lines in Figure 3c) to the No. 9 switch section of the No. 7 multiplicand key relay switch. This section of the switch is connected with the wire 486 leading to bus bar 487. A wire, 488, connects the bus bar with reverse contact 489, while a wire, 490, connects this contact with the contact 491. A switch blade, 492, connects the contact 491 with the contact 493, which is secured to a wire 494. This wire is secured to a lock bar wire 495, which is connected with one side of the No. 6 solenoid of the L—92 bank, the opposite side of the solenoid being conected with the bus bar 300.

The circuit from the No. 4 lock bar solenoid of the R—92 bank to the No. 5 lock bar solenoid of the L—92 bank through the No. 9 multiplier key relay switch is as follows:

A wire, 413, connects the bus bar 414 with the No. 6 switch section of the No. 9 multiplier key relay switch. A circuit is completed along wire 496, as indicated in dotted lines in Figure 3c, to the No. 9 section of the No. 6 multiplicand key relay switch. A wire, 497, connects this switch section with bus bar 498, which in turn is connected to a wire 499. This wire leads to reverse contact 500 of the reversing switch. A wire, 501, connects this contact with the contact 502, from which a circuit is completed through switch blade 503 to contact 504. A wire, 505, connects contact 504 with a wire 506 secured to one side of the No. 5 lock bar solenoid in the L—92 bank. The opposite side of this solenoid is attached to the bus bar 300.

The circuit from the lock bar solenoid No. 5 in the R—92 bank to the lock bar solenoid No. 4 in the L—92 bank and through the No. 9 multiplier key relay switch, continues to wire 424 which connects with the No. 5 section of the No. 9 multiplier key relay switch. A wire, 507, indicated by dotted lines in Figure 3c, connects this section of the switch with the No. 9 section of the No. 5 multiplicand key relay switch. The circuit then continues along wire 508 to the bus bar 509, which bar is connected with a wire, 510, leading to the reverse contact 511 of the reversing switch. A wire, 512, secures this contact to a contact, 513, from which a circuit is completed through switch blade 514 to contact 515. A wire, 516, connects contact 515 with a wire 517 connected with one side of the No. 4 lock bar solenoid in the L—92 bank, the circuit being completed through bus bar 300. The connection between lock bar solenoid No. 6 in the R—92 bank and lock bar solenoid 3 in the L—92 bank is completed through the No. 9 multiplier key relay solenoid from bus bar 434 to the No. 4 section of the No. 9 multiplier key relay switch. The circuit then continues along wire 518 (as indicated in dotted lines in Figure 3c) to the No. 9 key section of the multiplicand key relay switch. A wire, 19, connects with this switch section and is secured to the bus bar 520. A wire, 521, connects the bus bar with reverse contact 522 of the reversing switch. A wire, 523, connects this contact with a contact, 524, of the switch, while switch blade 525 completes the circuit from contact 524 to contact 526. A wire, 527, connects contact 526 with wire 528, which is secured to one side of the No. 3 lock bar solenoid in the L—92 bank, the other side of the solenoid being connected to bus bar 300.

A connection from the No. 7 lock bar solenoid of the R—92 bank to the No. 2 lock bar solenoid of the L—92 bank is completed through the No. 9 multiplier key relay switch from bus bar 442 to wire 444, which connects with the No. 3 section of the No. 9 multiplier key relay switch. A wire, 529, connects this switch section with the No. 9 section of the No. 3 multiplicand key relay switch. A wire, 530, connects this section of the switch with the bus bar 291, while a wire, 292, connects the bus bar with reverse contact 293, from which current flows along wire 294 to contact 295, and thence through switch blade 296 to contact 297 and the wire 298 which is connected with wire 299 leading to one side of the No. 2 lock bar solenoid in the L—92 bank.

The connection from lock bar solenoid No. 8 in the R—92 bank with the lock bar solenoid No. 1 in the L—92 bank, and through the No. 9 key relay switch is completed from bus bar 452 to wire 454 which connects with the No. 2 section of the No. 9 multiplier key relay switch. A wire, 531, connects this section of the multiplier switch with the No. 9 section of the No. 2 multiplicand key relay switch, from which the circuit continues along wire 532 to bus bar 533. A wire, 534, connects this bus bar with reverse contact 535 of the reversing switch from which current flows along wire 536 to contact 537. A switch blade, 538, makes connection from contact 537 to contact 539. A wire, 540, connects the contact 539 with the wire 541, which is secured to one side of the No. 1 lock bar solenoid in the L—92 bank, the circuit being completed to bus bar 300.

The connection from the No. 9 resistance coil in the R—92 bank with the zero lock bar solenoid in the L—92 bank, through the No. 9 multiplier key relay solenoid, is completed from bus bar 462 along wire 464 to the No. 1 section of the No. 9 multiplier key relay switch. This section is provided with a wire, 542, which connects with the No. 9 section of the No. 1 multiplicand key relay switch. The wire, 543, connects with bus bar 544 which is provided with a wire 545 connected with reverse contact 546 of the reversing switch. The current then flows along wire 547 to contact 548 and thence to switch blade 549 to complete a connection with contact 550. This contact is provided with a wire, 551, secured to a wire, 552, which leads to one side of the zero lock bar solenoid in the L—92 bank, the circuit being completed through the bus bar 300.

From the foregoing description of the secondary circuits which are traced through the No. 9 multiplier key relay switch, it is to be understood that the lock bar solenoids of the two banks will be connected with sections of the key relay switches, which will produce a combination of numbers in the products corresponding to the product as represented by the multiplication of the numeral of the particular key relay switch and the numeral of the switch section to which the bus bar is connected. Thus every combination of key numeral and switch section numeral which would give a product having a 1 in the right-hand column will be connected with the No. 1 lock bar solenoid in the R—92 bank. This would apply to products involving each digit from 1 to 9, inclusive, in their right-hand columns. In the same way the multiplication of a key numeral and the numeral of the particular switch section of said key numeral relay switch will be connected with the lock bar solenoid in the L—92 bank controlling a numeral to be "set-up" in the left hand column of the product obtained by the multiplication.

As previously explained, the machine with which the present invention is concerned operates by successively multiplying one digit of the multiplicand with one digit of the multiplier, which will produce a series of products of two columns or less, and in order to obtain a total from these products it is necessary to arrange them in columns so that the total from the addition of the arranged products will give a correct sum and product having the proper number of places in the answer. In order to obtain this result, it has been necessary to alternate the relation of the multiplier and multiplicand key banks with the L—92 and R—92 lock bar solenoid banks, and for this reason the reversing switch has been provided. The circuit switches which have been previously traced through the reversing switch are those which will cause the R—92 bank of lock bar solenoids to be connected with the multiplier bank of keys so that numbers represented by the R—92 bank of lock bar solenoids will be set up in the right-hand column of the particular product and the L—92 bank of lock bar solenoids will be directly connected with the multiplicand bank of relay switches so that the numbers in the L—92 bank of lock bar solenoids will be set up in the left hand column of the particular product. When the switch has been shifted or reversed, the connections will be closed so that the R—92 bank of lock bar solenoids will connect with the multiplicand key relay switches and the L—92 bank of lock bar solenoids will be connected with the multiplier key relay switches.

In the reverse operation, blade 458 of the reversing switch will connect contact 461 with a contact 553 which leads to wire 554 in the No. 9 resistance coil in the L—92 bank, the circuit being completed through bus bar 300. The switch blade 448 will make electrical connection from contact 451 to contact 555, which leads to wire 474 of the No. 8 lock bar solenoid in the L—92 bank. Switch blade 438 will make connection between contact 444 and contact 556, which is connected to wire 484 of the No. 7 lock bar solenoid in the L—92 bank. Switch blade 428 makes connection with contact 431 and contact 557, which contact connects with wire 495 of the No. 6 lock bar solenoid in the L—92 bank.

Switch blade 418 makes connection between contact 421 and contact 558, which is secured to a wire, 506, of lock bar solenoid No. 5 of the L—92 bank.

Switch blade 408 connects contact 411 with contact 559 to which the wire 517 is attached. This wire is secured to one side of lock bar solenoid No. 4 of the L—92 bank. Switch blade 398 connects contact 401 and 560 with wire 528 and the No. 3 lock bar solenoid of the L—92 bank.

Switch blade 389 connects contact 391 with contact 561 and the wire 299 of the No. 2 lock bar solenoid of the L—92 bank. Switch blade 380 connects contact 383 with contact 562 and wire 541 of the No. 1 lock bar solenoid of the L—92 bank. Switch blade 282 connects contact 285 with contact 563 and wire 552 of the zero lock bar solenoid in the L—92 bank.

Proceeding with the description of the left-hand side of the reversing switch, when in its reverse position switch blade 471 will establish connection between contacts 468 and 564 which connects with wire 445 of the No. 8 lock bar solenoid. Switch blade 481 will connect with contact 478 and contact 565 which is secured to wire 435 connected with the No. 7 lock bar solenoid of the R—92 bank. The switch blade 492 connects contact 489 with contact 566 which is secured to wire 425 of the No. 6 lock bar solenoid in the R—92 bank. Switch blade 503 connects contact 500 with contact 567 which is secured to wire 415 of the lock bar solenoid No. 5 in the R—92 bank.

Switch blade 514 connects contact 511 with contact 568 which is secured to wire 405 of the No. 4 lock bar solenoid in the R—92 bank. Switch blade 525 connects contact 522 with contact 569, which is secured to wire 395 of the No. 3 lock bar solenoid in the R—92 bank.

Switch blade 296 connects contact 293 with contact 570 which is secured to wire 386 of the No. 2 lock bar solenoid in the R—92 bank. Switch blade 538 connects contact 535 with contact 571, which is secured to wire 377 of the No. 1 lock bar solenoid.

Switch blade 549 connects contact 546 with contact 572 and wire 279 of the zero lock bar solenoid in the R—92 bank.

*Reversing switch circuit*

The reversing switch circuit of solenoid 158 is as follows:

The circuit flows through the feed wire 167 to the collector bar 191, through contact maker 190 to contacts 573 to 580, inclusive. These contacts are all connected with a distributor wire 581, which wire is secured to a wire 582 leading to one side of the reverse solenoid 158. The opposite side of this solenoid is connected with the feed wire 168 by wire 583. The contacts for the reversing switch are mounted on the frame member 104 of the selector switch and the contact maker 190 is carried on the disk 109.

*Stop solenoid circuit*

The stop solenoid is energized through a wire 584 which connects with one side of the solenoid 154. The opposite side of this solenoid is connected with a wire, 585, secured to wire 179. This wire leads to contact 180. A contact maker 181 completes the circuit to a collector bar 183. This bar is connected with the return feed wire 168.

*Operation*

In explaining the operation of the machine with which the present invention is concerned, a typical example will be solved on the machine and all of the operations concerned therewith will be traced. The multiplicand 78 will now be multiplied by the multiplier 59. The problem is set up in the multiplicand and multiplier key banks. It is immaterial which bank is first operated. It will be assumed, however, that the multiplicand key bank is first actuated to depress the No. 8 key in the units column and the No. 7 key in the tens column, while in the multiplier bank key 9 is depressed in the units column and key 5 is depressed in the tens column.

When the No. 9 multiplier key in the units column has been depressed, it will partially complete a circuit from a wire 188 to a wire 213 leading to one side of the No. 9 multiplier key relay solenoid. The opposite side of this solenoid is connected with wire 211, which leads to the return feed wire 168. It is to be understood that this circuit will not be completed until operation of the selector switch is produced and for that reason the circuit will not be completely traced until the switch operation is described.

When the No. 5 key in the tens order of the multiplier key bank is depressed, it will partially complete the circuit which passes along the wire 194 to wire 207 leading to one side of the No. 5 multiplier key relay solenoid. A wire, 205, connects to the opposite side of this solenoid and is attached to the return feed wire 168.

When the No. 8 key in the units column of the multiplicand key bank is depressed, it will partially complete a circuit from wire 217 through the key switch to wire 254, and thence to the return wire 168.

When the No. 7 key in the multiplicand bank of keys is depressed, it will partially complete a circuit from wire 224 to the key switch and then along wire 252 to the return feed wire 168.

The problem is now set up ready for its solution.

It will be understood that the main switch, 166, has been closed and the next operation is to press the operating key 16. This completes the circuit from feed wire 167 to wire 174, which is connected to one side of the operating solenoid 143. The circuit then continues along wire 173 to one contact of the operating key 16. The other contact of this key is connected with return feed wire 164 by conductor 172.

When the operating solenoid 148 is energized, it will move the plunger 149 upwardly and swing the lever 150 in the direction of the arrow —b—, in Figure 24 of the drawings. This will rotate the shaft 151 to swing the lock pawl 151' upwardly in the direction of the arrow —c—, as shown in Figure 25 of the drawings. The tooth on the end of the lock pawl will then swing out of engagement with the notch, 152, in the edge of the disk 153. This will permit the clutch spring 119 to expand and will shift the clutch sleeve 118 lengthwise of the shaft section 115 and in the direction of the arrow —d—, as shown in Figure 23 of the drawings. This action will operate the bell crank 143 to pull the link, 142, and to swing the lever, 141 with its shaft. A detent, 138, is fixed onto the shaft and is normally seated in a notch, 140, in the flange of the clutch flange of member 123. This movement, however, will swing the detent out of register with the notch and will permit the clutch 120 to rotate if driven. Simultaneously with the shifting movement of the clutch sleeve, 118, the pins 121 will move into register with openings 124 in the flange 125 of a complementary clutch member 126. In view of the fact that the motor is continuously running during the operation, the clutch will become locked and will be simultaneously set into driving motion. In order, however, to prevent sudden shock upon the parts and to insure that the clutch pins 121 register with the openings 124 without difficulty, the flexible drive comprising spring 135 has been interposed between the clutch member 126 and the drive shaft 127. This will cause the drive shaft 127 to directly drive the selector shaft 108.

When the keys in the key banks were depressed, they were held in their depressed positions by lock pawls 54, which engaged shoulders on lock lugs 53, carried on the shanks of the depressed keys. This will insure that the pressure button, 47, on the lower end of the depressed key shank will engage a pressure point 48 and will hold it down to maintain the circuit which was normally broken by the contact finger 49.

As the shaft 108 rotates, it will carry the discs 109, 110 and 111 with it and will cause contact makers 190, 325, 181, 303 and 276 to progressively complete the circuits necessary to carry out the series of multiplications required to produce the products making up the final product as set up on the product dials. The aforementioned contacts on the selector switch will then move to their first position and will carry out the functions necessary to perform the multiplication of 9×8 in the problem.

The current passes along the incoming feed wire 167 to the wire 192 and the collector bar 191. The circuit then continues through contact maker 190 to collector bar 189 and then passes along wire 188 to one side of the No. 9 primary key switch in the units column of the multiplier bank. The circuit then continues along wire 213 through the No. 9 key relay solenoid and then along wire 211 to the return feed wire 168. This operation will energize the No. 9 multiplier key relay solenoid and will cause all nine of its switch sections to be closed.

In order to energize the No. 8 multiplicand key relay solenoid, the current passes along incoming feed wire 167 to the wire 192 and thence along the collector bar 191 to the contact maker 190, and then to contact 219, after which the current will flow along distributor wire 218 to a wire 217 and thence to one side of the No. 8 key switch in the units column of the multiplicand bank, after which the current will flow along wire 254 to the No. 8 solenoid in the multiplicand bank and through the solenoid along wire 253 to the return feed wire 168. This will energize the No. 8 multiplicand solenoid in the units bank and cause all of its switch sections to be closed. The primary circuits controlled by the keys will have then been completed.

It is now necessary to energize the secondary circuit by which the product dials will be operated to set up the product represented by the multiplication of 8 in the multiplicand and 9 in the multiplier. The current then flows along wire 167 to the collector bar 326 and then contact maker 325 to contact 323, after which it flows along wire 322 through the tens column product dial solenoid 83, which when energized will push upwardly upon its plunger 82 to swing the lever 78 in an upward direction and to swing the gear segment 75 in the direction of the arrow —e—, as shown in Figure 11. This will tend to rotate the pinion 74 and the dial 72 in the units column. Before this action has the opportunity to take place, however, the current will have continued along wire 321 to contact 304, after which the current flows along contact maker 303 to the collector ring 302, which is connected with a wire 301, leading to the bus bar 300 of the L—92 bank of lock bar solenoids. The circuit then is completed through the No. 7 lock bar solenoid of the L—92 bank to the conductor 484.

When the No. 7 lock bar solenoid is energized, it will move its plunger 95 upwardly to swing its plates 97 on their axes 98, and this will simultaneously lift and shift the lock bar 90 affected thereby, so that the teeth 91 upon this lock bar will stand in the path of travel of the teeth upon the product dial stop bar 85, thus placing an obstacle in the path of travel of the teeth 101 on the product stop bars and determining the distance of longitudinal motion of the stop bars and the subsequent arc of rotation of the product dial associated therewith whereby the dial will be brought to rest with the No. 7 numeral displayed in the product dial window 89 of the tens column.

The current then flows along the wire 484 to contact 482 of the reversing switch and then to contact 480 through the switch blade 481, after which the current will pass along wire 479 and then to contact 478 to wire 477', which connects to bus bar 477 and then to one of the contacts of the No. 9 section of the No. 8 multiplicand relay switch in the units column, after which a circuit is completed through the No. 9 section of this switch and flows along a wire 475 to the No. 8 section of the No. 9 multiplier key relay switch. The circuit is then completed through this switch and flows along wire 394' connected to bus bar 394 and then to the reversing switch, which is connected with wire 393 secured to contact 391 of the reversing switch, after which the current passes along wire 392 to contact 390 and thence through switch blade 389 to contact 388. The current then flows along wire 387 to wire 386 which connects with the No. 2 lock bar solenoid in the R—92 bank. This will energize the No. 2 solenoid and cause it to shift a No. 2 lock bar in the path of travel of the stop bar 85 of the units column products dial and will determine the numeral which shall be displayed by the product dial in the units column. The circuit then continues along wire 278 to a collector bar 277, the current then flowing across contact maker 276 to contact 260, which is connected with wire 258 leading to one side of the units column product dial solenoid by which the units column dial will be rotated as the solenoid is energized in the manner previously described for the tens column. The current then flows along wire 257 to contact 256 and then passes along contact maker 181 to collector bar 183 after which the circuit will be completed from the collector bar 183 to the return feed wire 168. This will cause the numbers 72 to be set up in the tens and units product dials.

After the contact makers have passed over the first set of contacts in the selector switch and have thus momentarily established and broken the circuits controlled thereby, (with the exception of the primary circuit of the multiplier keys, which is sustained throughout the time the contacts on the disks travel across the contacts for all of the columns in the multiplicand bank) the contact makers will then pass to the contacts on the selector switch representing the second column in the multiplicand key bank.

In this manner multiplication will then be effected between the digit in the units column of the multiplier key bank and the digit in the tens column of the multiplicand key bank. In this particular problem this will mean the multiplication of 9 in the multiplier units column with 7 in the multiplicand tens column.

Attention is also directed to the fact that, at this time, the product of 9×7, which is 63, must be moved over so that the 3 of the product will be in the tens column of the answer and the 6 of the product will be in the hundreds column of the answer. In order to bring this about, it is necessary for the reversing switch to function so that the number to be set up in the right-hand column of this particular product will fall in the second column of the product dials, this being brought about by reversing the connections of the L—92 and R—92 banks of solenoids to the key banks whereby the L—92 bank of solenoids will be connected to the multiplier bank of keys to insure that the number controlled and to be set up by the multiplier key will be first recorded and will fall in the right-hand column of the answer, while the number to be controlled and set up in the product dials by the multiplicand key will be the second to be recorded and will be set up in the left-hand column product dial of the particular answer.

Figure 2:
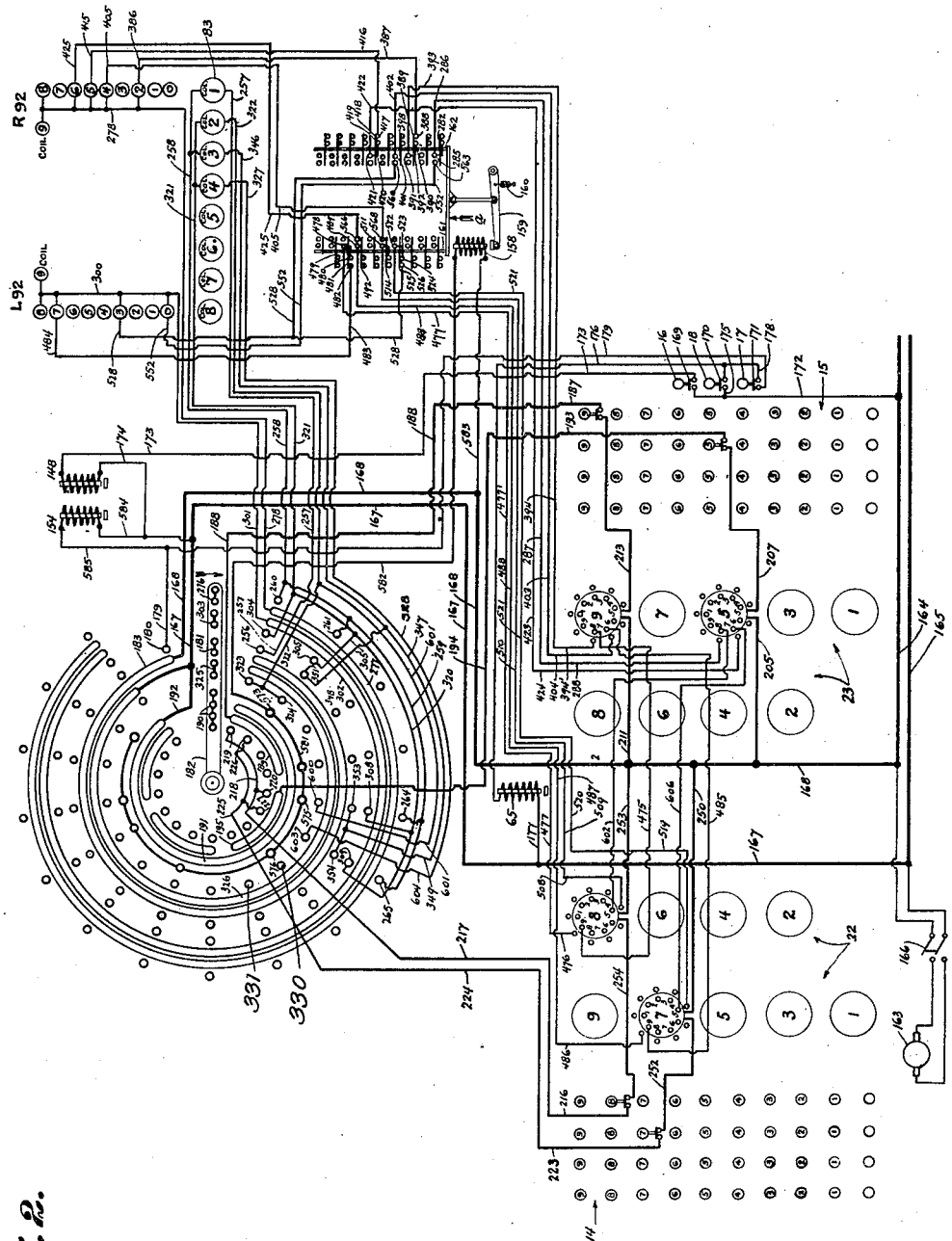
Figure 2 is a view showing a skeleton wiring diagram upon which the operation of this machine will be traced while solving a particular problem in multiplication.

The circuits controlling this operation are traced as follows:

The current flows from wire 167 to the wire 192 and thence to collector bar 191 on the frame member 104 of the selector switch. The current then flows along the bar across the bar, across contact maker 190 to contact 226, and thence along distributor wire 225 to wire 224 which leads to bus bar 223 and one side of the No. 7 key switch in the multiplicand bank of the tens column. The current then flows through the switch to wire 252 and then through the No. 7 key relay solenoid of the multiplicand bank, after which it flows along wire 250 to return wire 168. When this primary circuit is completed through the No. 7 key relay solenoid, the solenoid will be energized to raise its plunger 67 and to cause all of the switch members 69 and 70 to be brought into engagement, thereby partially establishing the nine secondary circuits controlled by this particular key. It will be understood from an examination of the diagram of the selector switch, as shown in Figure 2, that the units column key switch in the multiplier bank will remain closed, due to the fact that the contact maker 190 continues to complete an unbroken circuit from collector bar 191 to collector bar 189.

The reversing switch will now be actuated and a circuit will be completed from wire 167 to wire 192 and the collector bar 191 on the frame member 104, and will flow through contact maker 190 to reversing contact 573, to distributing wire 581, then along wire 582 to one side of the reversing switch solenoid 158. This solenoid will be energized to swing the lever arm 159 upwardly and simultaneously shift the switch rods 161 and 162 to bring their switch blades in contact with their respective other switch contacts. The circuit then continues along wire 583 to the main lead wire 168. This will re-arrange all of the lock bar circuits in the manner previously described. The lock bar circuits will now be traced.

The circuit passes along wire 167 to collector bar 326 and then through contact maker 325 to contact 324, after which the current flows along wire 322 to one side of the tens column product dial solenoid, after which the circuit continues along bus bar 321 to distributor wire 320 connected with a contact 305 by a wire 305', after which the circuit continues through contact maker 303 to the collector bar 302 which controls the L—92 bank of lock bar solenoid circuits. The collector bar 302 connects with the bus bar 300 of the L—92 bank of lock bar solenoids by a wire 301. The circuit then continues through lock bar solenoid No. 3 of the L—92 bank to wire 528 and thence along wire 528 to contact 560 of the reversing switch. The switch blade 398 completes the circuit to contact 401, after which the current flows along wire 402 to bus bar 403 and thence along wire 404 to the No. 7 section of the No. 9 key relay switch of the multiplier bank, after which the current flows through the No. 7 section of this switch and then along wire 485 to the No. 9 section of the No. 7 key relay switch of the multiplicand bank. The current continues through this section of the swtich along wire 486 to bus bar 487 and thence along wire 488 to contact 489 of the reversing switch, after which current flows along switch blade 492 to the contact 566 and then flows along wire 425 to the No. 6 lock bar solenoid in the R—92 bank, after which the current flows to bus bar 278 and thence along this wire to collector bar 277 of the selector switch. The current then flows through contact maker 276 to contact 261 to a distributor wire 259. This wire connects with the bus bar 258 of the odd numbered column product dials. The current then flows to the hundreds column product dial and then continues along wire 346 to distributor wire 347, after which the current passes along a wire 348 to contact 351. The circuit is then made by contact maker 181 to collector bar 183, and thence along return feed wire 168 to the source of supply.

When this operation has been completed the tens column product dial will have been actuated to move three points in addition to the 7 moved by the first operation, so that now a zero will be displayed in the tens column.

It will be understood that the mechanism in the dials themselves provides that the tens will be carried over into the next higher column as the operation proceeds, and that this mechanism is so designed as to permit all of the dials to be "cleared" after the problem has been solved. Such mechanism is embodied in standard calculating machine practise and the details of its construction will not be here shown. A suitable structure for this purpose is shown and described in the U. S. patent to Gooch No. 1,128,679 issued February 16th, 1915.

After the number in the units column of the multiplier has been used as a multiplier with each digit in the multiplicand, the digit in the tens column of the multiplier will be used as a multiplier with each digit of the multiplicand. In the two operations previously described, the 9's in the units column have been separately multiplied with 8 and then by 7 of the multiplicand, and it is now necessary to separately use the 5 in the tens column of the multiplier bank as a multiplier with the digits 8 and 7 of the multiplicand in order to obtain the final product.

By reference to Figure 2 of the drawings, it will be seen that the contacts arranged in radial rows intersecting the collector bar 189 are used in the first operation of the calculation, that is to say, the multiplication of a units digit in the multiplier bank with the successive digits in the multiplicand number. In this case four digits of the multiplicand are provided, although it will be understood that in practise the key banks may be of any desired width. In carrying out multiplication by the tens column digit, multiplier bank and the separate digits of the multiplicand number, the contact makers of the selector switch move to the segment subtended by the arc represented by the collector bar 195. The radial rows of contacts in this segment represent the individual columns of the multiplicand bank. The multiplication will proceed as follows:

The primary circuits are completed from wire 167 along wire 192 to the collector ring 191, and thence across the contact maker 190 to the collector bar 195, after which the current passes along wire 194 to the bus bar 193 and one side of the No. 5 multiplier key switch. The circuit then continues through this switch along wire 207 to the No. 5 multiplier key relay solenoid, and thence along wire 205 to the return feed wire 168. This will cause the No. 5 multiplier key relay solenoid to be energized to partially close all nine secondary circuits affected thereby. At the same time a circuit will be completed from wire 167 along wire 192 to the collector bar 191, and thence to contact 220, thereafter continuing along distributing wire 218 to wire 217 and then to bus bar 216 and one side of the multiplicand key which is in the units column, this being the No. 8 key in this particular problem.

The circuit then continues along wire 254 to the No. 8 multiplicand key relay solenoid, after which the current flows along wire 253 to the return feed wire 168. This will cause the No. 8 multiplicand key relay solenoid to to be energized and will close all nine sections of the No. 8 multiplicand switch associated therewith.

The secondary circuit affected by the closing of the No. 5 multiplier key relay switch and the No. 8 multiplicand key relay switch will now be traced.

When the selector switch is on the second segment, collector bar 195 and the contact maker 190 over contact 575, the product of 8 × 5, which is 40, must register on the tens and hundreds column product dials. The tens column product dial solenoid must be in series with the multiplier bank of key relay switches. The tens column stop bar is controlled by the lock bars of the L—92 bank of lock bar solenoids. The hundreds column product dial must be in series with the multiplicand bank of key relay switches and its stop bars are controlled by the lock bars of the R—92 bank of lock solenoids. In order to produce this condition, the reversing switch solenoid is again energized as in the second operation of the problem to bring this switch into their reversed positions.

The secondary circuit continues from the feed wire 167 to collector bar 326 and from thence through contact maker 325 to the contact 600, after which the current will flow along wire 601 to wire 322 and thence to one side of the tens column product dial solenoid, the current then continuing along bus bar 321 to distributor wire 320, and thence to contact 308, after which contact maker 303 will complete a circuit to the collector bar 302, which will continue along wire 301 to the bus bar 300, thereafter passing through zero lock bar solenoid in the L—92 bank, and then along wire 552 to contact 563 of the reversing switch, after which it flows through switch blade 282 to contact 285 and wire 286 to bus bar 287, which connects with the eighth section of the No. 5 multiplier key relay switch. The circuit then continues through this section to a wire, 602, to the No. 5 section of the No. 8 multiplicand key relay switch, after which the current continues along a wire, 508, to a bus bar 509, and then along wire 510 which leads to the contact 511 of the reversing switch. The circuit then flows to contact 568 through the switch blade 514, thereafter continuing along wire 405 which is connected to one side of the Number 4 lock bar solenoid in the R—92 bank. The opposite side is connected with a wire, 278, which connects with the collector bar 277 in contact with contact maker 276 through which current flows to contact 264, after which the circuit continues along distributor wire 259, which is connected with bus bar 258 leading to one side of the odd numbered product dial solenoids, the circuit continuing through the product dial solenoid in the hundreds column to wire 346 leading to distributor wire 347 and connected with a contact, 353, by a wire, 349. The circuit then continues through contact maker 181 to the collector bar 183 and thence to return feed wire 168.

The final multiplication in solving the present problem is the multiplication of the multiplier 5 times the multiplicand 7 to produce the product 35, which is to be placed in the hundred and thousands columns of the product dials.

It is to be understood that the circuit through the reversing switch solenoid is momentarily made during the muliplication operation in which it is required, and that thereafter it is automatically restored to its normal position to cause the L—92 bank of stop bar solenoids to be connected with the multiplicand bank of key relay switches and the R—92 bank of stop bar solenoids to be connected with the multiplier bank of key relay switches.

The primary circuits involved are traced as follows:

The current flows from feed wire 167 to wire 192 connecting with collector bar 191 and thereafter maintaining the primary circuit through the No. 5 multiplier key relay solenoid by the continued contact of contact maker 190 with collector bars 191 and 195.

The circuit through the multiplicand digit in the tens column of the muliplicand bank is traced from the feed wire 167 to the wire 192, and thence through collector bar 191 to the contact maker 190, thereafter passing to contact 227 and thence along distributing wire 225 to wire 224 and to bus bar 223, to one side of the No. 7 multiplicand key switch. The circuit then passes along wire 252 to the No. 7 multiplicand key relay solenoid and then continues along wire 250 to the return feed wire 168.

The multiplicand key relay solenoid will thus be re-energized since it had previously been energized during the multiplication operation of 9×7. The No. 7 multiplicand key relay solenoid will close all nine of the switch sections associated therewith and will complete a secondary circuit which is traced as follows:

This secondary circuit continues along wire 167 to collector bar 326. Contact is then made by contact maker 325 to contact 603 to a wire 604, after which the current passes along distributor wire 605 to a wire 327 which leads to one side of the thousands column product dial solenoid. The current will then pass along bus bar 321 to the distributing wire 320, thence to contact 309; the contact maker 303 will then establish connection with the collector bar 302, after which the circuit continues along wire 301 to bus bar 300 of the L-92 bank of lock bar solenoids. The circuit then proceeds through the No. 3 lock bar solenoid of the L-92 bank wire 528, thereafter passing to the reversing switch where it connects with contact 526. Switch blade 525 connects the current to contact 524, after which it flows along wire 523 to the contact 522 and then flows along wire 521 connected to the bus bar 520, which is connected with wire 519 to the No. 5 section of the No. 7 multiplicand key relay switch. The current then continues along wire 606 to the No. 7 section of the No. 5 multiplier key relay switch, after which the circuit flows through this section of the switch to wire 424 connecting with the bus bar 423. A wire, 422, connects the bus bar with contacts 421 of the reversing switch, after which the current flows along wire 420 to contact 419 and then through switch blade 418 to contact 417, then proceeding along wire 416 to wire 415 to one side of the No. 5 lock bar solenoid in the R—92 bank, and thence along bus bar 278 and wire 278' to collector bar 277, and then through contact maker 276 to contact 265, after which the current passes along wire 259 to bus bar 258 and the hundreds column solenoid, thereafter passing along wire 346 to the distributing wire 347 and thence to contact 354, thereafter passing through contact maker 181 to the collector bar 183, and then continuing along the return feed wire 168.

After the contact makers have completed their entire circuit, the contact maker 181 will make a connection between collector bar 183 and contact 180, thereby establishing a circuit through wire 179 and the stop solenoid 154 and from wire 584 and the feed wire 167. This circuit will energize the stop solenoid 154, which will move the plunger 155, as particularly shown in Figures 25 and 26 of the drawings, and will swing the lever arm 156 and lock disc 153. As this arm and lock disc swings the tooth at the end of the pawl 151' will drop into the recess in the lock disc 153.

By reference to Figure 26 of the drawings, it will be seen that the lock disc structure 153 is connected to a sleeve 153' by a coil spring 608. The sleeve 153' is fastened to the shaft 139, while the lock disc 153 is fixed to the lever 156 and free on shaft 139. This will cause tension to be placed on the shaft 139 to tend to swing the detent 138 into the notch 140 in the clutch flange of member 123. Due to the fact, however, that the clutch members are still in engagement and that the shaft 127 and 108 are rotating, the detent may not be in a position to register with the notch 140 at the time the stop solenoid 154 is actuated. The detent, however, will be yieldably held against the face of the flange carrying the notch and when the notch moves to a point of register with the detent, the detent will swing into the notch under the action of the spring 608. This swinging movement of the detent will draw the bell crank in the direction of the arrow —f—, as shown in Figure 23, which will cause the clutch pins 121 to be retracted from the openings 124 in the clutch flange 125, thereby disconnecting the machine and rendering it in position for another multiplication.

In order to clear the dials, suitable connections from the dials are made with the manual key release key No. 18. This is accomplished by mechanism in common practice and will not at the time be described.

It will thus be seen that from a description of the circuits in the operation in solving the multiplication problem of 59×78, that the mechanism here disclosed will rapidly and accurately cause multiplication to be made without repetitive addition, but by direct multiplication operations, thereby eliminating inaccuracy due to manual manipulation of the machine and insuring that the products may be automatically obtained.

While I have shown the preferred form of my invention as now known to me, it will be understood that various changes might be made in the combination, construction and arrangement of parts by those skilled in the art without departing from the spirit of the invention as claimed.

This application is a continuation in part of my copending application entitled "Calculating machine", filed by me in the United States Patent Office on December 10, 1924, and bearing Serial No. 754,963.

Having thus described my invention, what I claim and desire to secure by Letters Patent is—

1. An electric calculating machine comprising a multiplicand key, a multiplier key, an electrically operating means for visibly registering a product, electric circuits including said multiplicand key and said multiplier key whereby the concurrent actuation of the multiplicand key and the multiplier key to partially close said circuits will set up a multiplicand and a multiplier to be multiplied together, and means acting to completely close said circuits whereby to directly set up the complete product on the product mechanism.

2. An electric calculating machine comprising a bank of multiplicand keys, a bank of multiplier keys, a bank of product dials for visibly registering a final product, electric circuits for said multiplicand keys, electric circuits for said multiplier keys whereby the concurrent actuation of said keys will partially close corresponding circuits to "set up" a multiplier and multiplicand to be multiplied, and means acting to completely close said partially set up circuits whereby to directly actuate the product dials and set up a final product resulting from the multiplication of the said multiplier and multiplicand.

3. A calculating machine, comprising a multiplicand key, a multiplier key, electric circuits including the same, a bank of product registering members, electric means for operating said members, an electric circuit including the same, and means whereby the closing of the circuits, including the keys, will directly act to close the circuit including the product registering members, and will cause the product obtained by the multiplication of the multiplicand and multiplier key numerals to be registered on the registering means.

4. A calculating machine, comprising a bank of multiplicand keys, a bank of multiplier keys, partial primary electric circuits, one for each key of both banks, a bank of product registering dials, electric operating means therefor, secondary electric circuits for said operating means, and means whereby the concurrent closing of a partial primary circuit of the multiplicand bank and a partial primary circuit of the multiplier bank will directly cause a predetermined secondary circuit including the product dials operating means to be closed, whereby the product resulting from the multiplication of the numerals represented by the key circuits closed will be registered by the product dials.

5. A calculating machine, comprising a bank of multiplicand keys arranged in columns representing the digits of a number, a bank of multiplier keys arranged in columns representing the digits of a number, individual switches controlled by each key, partial primary circuits including the switch keys, a bank of product registering members, electrical means for individually actuating said members, secondary circuits including said means, and means whereby the concurrent closing of the partial primary circuits by operating selected switch keys of the multiplier and multiplicand bank will prepare predetermined secondary circuits to be directly closed and numbers to be set up on the product dials representing the product obtained by the multiplication of the numbers "set up" in the multiplicand and multiplier key banks.

6. In a calculating machine, a partial primary electric circuit representing a digit of a multiplicand number, a partial primary electric circuit representing a digit of a multiplier number, a secondary electric circuit representing the product numeral obtained by the multiplication of the multiplicand digit and the multiplier digit, product registering means in said secondary circuit, and means whereby the closing of said partial primary circuits will act directly to close the secondary circuit and cause the product numeral to be directly registered.

7. In a calculating machine, a partial primary circuit representing a digit in a multiplicand numeral, a partial primary circuit representing a digit in a multiplier numeral, a registering device adapted to directly register the product numerals representing the multiplication of the digits of the multiplicand and multiplier, a normally open secondary circuit, including said registering means, and means whereby the concurrent closing of the selected multiplicand and multiplier digit partial primary circuits will act to close a predetermined product circuit to cause the product represented by the multiplication of the multiplier and multiplicand digits to be directly registered by the registering means.

8. In a calculating machine, a bank of product registering devices by which the digits of a product number may be registered, electrical means for selectively operating said product registering devices, electric circuits, including said product registering devices, said circuits representing the available product numerals to be obtained by the multiplication of any two digits, a bank of multiplicand digit switches, a bank of multiplier digit switches, partial primary circuits including the same, said circuits being adapted to be partially closed by the combined closing of a multiplier digit switch and a multiplicand digit switch, and means whereby the concurrent closing of partial primary circuits, including a multiplicand digit switch and a multiplier digit switch, will act to automatically and directly close the secondary circuit representing the product obtained by the multiplication of the closed multiplicand digit switch and the closed multiplier digit switch whereby said product number will be visibly "set up" by the registering means.

9. In a calculating machine, a bank of multiplicand digit switches, a bank of multiplier digit switches, electric circuits for said multiplicand and multiplier bank of switches, said circuits being complementary to each other in their operation, a bank of product registering members, electric means for selectively operating said members, a series of product circuits representing product numbers obtained by the multiplication of a multiplicand digit and a multiplier digit, and means whereby the closing of complementary circuits of the multiplicand and multiplier digits will co-operatively select and close a product circuit representing the product numeral obtained by the multiplication of said multiplicand and multiplier digits, whereby said numeral will be indicated by the registering means.

10. A calculating machine, comprising a bank of multiplicand key switches, a bank of multiplier key switches, electric circuits separately including the switches of the multiplicand bank, electric circuits separately including the switches of the multiplier bank, the circuits of said multiplicand and multiplier banks being inter-related, a bank of product dials, electric operating means whereby to rotate said dials to indicate a desired number, a series of electric circuits, including said operating means, said circuits separately representing a product number to be obtained by the multiplication of a multiplicand digit and a multiplier digit, and means whereby the concurrent closing of multiplicand and multiplier key bank digit circuits will act to simultaneously close a product dial operating circuit of a determined denomination and selectively close a product dial circuit having the value of the product dial numeral to be obtained by the multiplication of the digit representing the closed multiplicand and multiplier circuits, and whereby the product dials will be rotated and set to visibly indicate said product numeral.

11. A calculating machine, comprising a bank of multiplicand key switches, a bank of multiplier key switches, a bank of product dials, by which product numerals may be indicated, electrical means for selectively rotating the product dials to cause them to indicate desired numerals, a series of electric circuits for energizing said product dial operating means, said circuits having different numerical values whereby they will cause different numerals to be registered by the product dials, the numerals representing the product of the multiplication of a one-digit number by a one-digit number, a circuit closing means for said electric circuits, electric circuits, including the key switches, means whereby the closing of selected key switches in the multiplier and multiplicand bank of keys will partially result in the closing of a circuit for rotating a product dial of a given denomination and a predetermined product dial circuit of a numerical value representing the product obtained by the multiplication of the one-digit number set up in the multiplicand and multiplier key switch banks.

12. A calculating machine, comprising a plurality of product dials, said dials having numbers on their edges whereby the rotation of the dials will permit different numbers to be displayed, the dials being arranged to "set up" a desired number of digits, product dial operating means, a series of electric circuits adapted to selectively control each product dial and by which the individual dials may be rotated to display a desired digit numeral, a multiplier key switch bank, a multiplicand key switch bank, electric circuits including said switches of both banks, and whereby the closing of switch circuits in the multiplicand bank and the closing of switch circuits in the multiplier bank will partially result in setting up the digits of a multiplicand number and the multiplier number to be multiplied, and means effected by the closing of said selected key switches to select and partially complete product dial circuits having a numerical value representing the product obtained by the multiplication of a multiplicand digit by a multiplier digit, and means operating to close the selected product dial circuits and to cause said circuits to consecutively actuate the product dials in progressive order and in a manner to cause said dials to indicate the product obtained by the multiplication.

13. A calculating machine, comprising banks of multiplicand and multiplier key switches, said switches being arranged in parallel numerical columns, the switches in each column indicating digits in arithmetical progression of 1 to 9, inclusive, and by which multiplicand and multiplier numerals may be "set up" when a key representing a digit in each place of a number is displaced to close the switch in the respective columns of key banks, electric circuits, including said multiplicand and multiplier switches, a row of product dials, each dial representing one column of a number resulting as a product of the multiplication of the number "set up" in the multiplicand and multiplier key banks, and each dial carrying the numerals 0 to 9, inclusive, arranged in arithmetical progression, means for rotating said dials, means for interrupting rotation of the dials, electric circuits, including said rotating means and said interrupting means, separately having the numerical and denominational value of a predetermined digit, and means effected by the closing of a switch in the multiplicand key bank and a switch in the multiplier key bank whereby predetermined and correlated product dial circuit will be partially prepared for energization to cause numerals to be set up on the dials representing the product of the multiplication of the controlling multiplier and multiplicand digit and means for completely closing the circuits including the switches of the multiplier and multiplicand keys.

14. A calculating machine, comprising banks of multiplicand and multiplier key switches, said switches being arranged in parallel numerical columns, the switches in each column indicating digits in arithmetical progression of 1 to 9, inclusive, and by which multiplicand and multiplier numerals may be "set up" when a key representing a digit in each place of a number is displaced to close the switch in the respective columns of key banks, electric circuits, including said multiplicand and multiplier switches, a row of product dials, each dial representing one column of a number resulting as a product of the multiplication of the number "set up" in the multiplicand and multiplier key banks, and each dial carrying the numerals 0 to 9, inclusive, arranged in arithmetical progression, means for rotating said dials to disclose a numeral representing a desired digit of a product numeral, means for interrupting rotation of the dials, electric circuits, including said rotating means and said interrupting means, and separately having the numerical and denominational value of a predetermined digit, and means effected by the closing of a switch in the multiplicand key bank and a switch in the multiplier key bank whereby predetermined and correlated product dial circuits will be prepared for energization to cause numerals to be set up by the dials representing the product of the multiplication of the controlling multiplier and multiplication digit, and a selector mechanism co-operating to close the product dial circuits whereby the digits of the numeral representing the product dial will be arranged in proper order on the several dials to indicate the product of the multiplication and means for completely closing the circuits including the switches of the multiplier and multiplicand keys.

15. A calculating machine, comprising multiplicand and multiplier key banks, the keys in said banks being arranged in parallel rows, the keys in each row being progressively numbered from 1 to 9, inclusive, a switch for each of said keys, a set of solenoids, separate electric circuits, including said solenoids and the key switches, the keys representing one numeral being arranged to affect one solenoid of the set and a selector switch adapted to momentarily close the circuits partly closed by the closing of key switches, said selector switch acting progressively from the circuit including the key switch in the units place of the number through the closed key switches of the higher places, multiplying switches actuated by said key solenoids whereby a plurality of secondary circuits may be partially completed by the energization of selected key solenoids, said secondary circuits being closed by the co-operative closing of switch sections actuated by solenoids in the multiplier and multiplicand key banks whereby a circuit having a numerical value of the product of the multiplication of the numerical value of the multiplicand and multiplier solenoids will be completed.

16. A calculating machine comprising a multiplicand key bank and a multiplier key bank, each consisting of plurality of parallel rows of keys numbered from 1 to 9 inclusive, rows representing the digit places of a numeral, key switches—one for each key in both banks—key relay solenoids having a value of 1 to 9, inclusive, circuits, including said solenoids, and keys of the same value, multiple contact relay switches each having a series of separate switch units having values of 1 to 9, inclusive, a dial mechanism by which the digits of a product may be obtained, separate secondary circuits including said dial mechanism and the switch units of the various relay switches, interconnecting means between switch units of the relay switches in the multiplicand and multiplier columns whereby the closing of a multiplicand relay switch of a given numerical value and a multiplier relay switch of a given numerical value will insure that a circuit will be partially closed having a numerical value representing the product of the numerals of the multiplicand and multiplier switch, and a selector mechanism whereby the relay solenoid circuits may be momentarily closed to energize relay solenoids of a value agreeing with the value of the key switch closed, said selector switch mechanism acting to progressively close the key switch circuits, beginning with the units place of the multiplier and multiplicand numerals, and continuing across the key banks and said selector switch acting to progressively close the secondary circuits required to "set up" the products obtained by the multiplication of numbers in the multiplicand and multiplier bank beginning with the digit of the units place in the answer and progressing through the number.

17. In a calculating machine, a product registering device including a plurality of dials arranged to represent the places of an answer, said dials each carrying a series of numbers from 0 to 9 inclusive, solenoids for rotating said dials independently of each other, stop means operating in conjunction therewith to selectively control the degree of rotation of the dial, a circuit including a solenoid and stop means whereby a predetermined numeral on the dial will be disclosed, and switch means co-operating therewith to cause said circuits to be progressively operated across the machine.

18. In a calculating machine, a product registering device comprising a plurality of dials each having the numerals from 0 to 9 thereon, and being arranged to disclose digits in the different places of an answer, means for separately rotating said dials, a stop bar in connection with each of said dials, actuating means, and a plurality of lock bars adapted to be selectively actuated to engage the stop bar and to limit the dial rotation to cause a predetermined figure to be disclosed.

19. A calculating machine, comprising a multiplicand bank of key switches, a multiplier bank of key switches, the switches of each bank having numerical values progressing from 1 to 9, inclusive, a set of multiplicand relay solenoids, one for the switches of each numerical value, a set of multiplier relay solenoids, one for each switch of corresponding numerical value, multiple switches, one adapted to be closed by each of said multiplicand and multiplier relay solenoids, the separate units of said switches having numerical value of the several key switches, a primary circuit, including a key of each of the key banks and a corresponding relay solenoid, a product registering mechanism, and a plurality of secondary circuits, including a predetermined switch section of each of the switches closed by the relay solenoids and including predetermined product registering mechanism whereby the product obtained by the multiplication of the two digits represented by the closed key switches will be registered by the mechanism.

20. A calculating machine, comprising a multiplicand bank of key switches, a multiplier bank of key switches, the switches of each bank having numerical values progressing from 1 to 9 inclusive, a set of multiplicand relay solenoids, one for the switches of each numerical value, a set of multiplier relay solenoids, one for each switch of corresponding numerical value, multiple switches, one adapted to be closed by each of said multiplicand and multiplier relay solenoids, the separate units of said switches having numerical value of the several key switches, a primary circuit, including a key of each of the key banks and a corresponding relay solenoid, a product registering mechanism, and a plurality of secondary circuits, including a predetermined switch section of each of the switches closed by the relay solenoids and including predetermined product registering mechanism whereby the product obtained by the multiplication of the two digits represented by the closed key switches will be registered by the mechanism, and means whereby the digits of the product will be registered in their proper places on the product dial beginning with the digit at the right-hand side of the answer.

21. A calculating machine, comprising a multiplicand bank of key switches and a multiplier bank of key switches, said switches being arranged in parallel columns, the switches in each column having progressive numerical value of from 1 to 9 inclusive, relay solenoids having similar values, one of said solenoids being included in a circuit of each of the keys in its respective bank and of the same numerical value, said key switches acting to partially close said circuits, a multiple switch, one for each of said relay solenoids, said switches having switch sections of the numerical value of each of the key numerals, a product dial registering means including a plurality of product registering dials by which the individual digits of the product may be separately set up, circuits including said product dial registering means and the switch sections of the multiplier and multiplicand key bank multiple switches whereby the actuation of a selected multiplicand key relay solenoid and a selected multiplier key relay solenoid will act in combination to prepare a predetermined dial operating circuit for closing said circuit having the numerical value of the product obtained by the multiplication of the two solenoids energized and a selector mechanism automatically operating to momentarily and progressively close the primary circuits including relay solenoids representing one digit of the multiplier and one digit of the multiplicand and the resulting product mechanism and thereafter automatically continuing to establish circuits through all of the combinations of one digit of the multiplier with one digit of the multiplicand and the resulting product circuits, and whereby the products obtained by the progressive digit multiplication will be directly allocated to proper columns in the answer "set up" in the product registering mechanism to cause the cumulative actuation of the registering mechanism to "set up" a final answer representing the sum of the products of all of the digit multiplications previously carried out.

22. A calculating machine adapted to multiply one numeral by another, in a continuous operation instigated by a single initial operation, which comprises a multiplier bank of keys and a multiplicand bank of keys, a key switch solenoid for each of said keys; and placed in a circuit including the respective keys, a multiple contact switch for each of said solenoids, circuits including a switch unit of the multiple contact switch of one key-bank with the switch unit of a multiple contact switch of the other key bank, product registering means and electric operating means therefor included in said last named circuits, whereby the concurrent closing of a contact switch circuit in each of the key banks will cause a circuit to be closed through switch units of the solenoids of both key banks to cause the product dial mechanism to be actuated to register numerals representing the product obtained by the multiplication of the two numerals represented by the depressed keys in the two key banks, and a selector switch mechanism interposed in all of said circuits whereby said circuits may be continuously and progressively closed through the two key banks and the product dial actuating means.

23. A calculating machine adapted to multiply one numeral by another, in a continuous operation instigated by a single initial operation, which comprises a multiplier bank of keys and a multiplicand bank of keys, a key switch solenoid for each of said keys, and placed in a circuit including the respective keys, a multiple contact switch for each of said solenoids, circuits including a switch unit of the multiple contact switch of one key bank with the switch unit of a multiple contact switch of the other key bank, product registering means and electric operating means therefor included in said last named circuits, whereby the concurrent closing of a contact switch circuit in each of the key banks will cause a circuit to be closed through switch units of the solenoids of both key banks to cause the product dial mechanism to be actuated to register numerals representing the product obtained by the multiplication of the two numerals represented by the depressed keys in the two key banks, a selector switch mechanism interposed in all of said circuits whereby said circuits may be continuously and progressively closed through the two key banks and the product dial actuating means, and a single member for setting said selector switch in operation to thereafter automatically carry out the multiplication.

WILLIAM M. BLACK.